US010377585B2

(12) United States Patent
Cyrulik et al.

(10) Patent No.: US 10,377,585 B2
(45) Date of Patent: Aug. 13, 2019

(54) STORAGE AND RETRIEVAL SYSTEM TRANSPORT VEHICLE

(71) Applicant: Symbotic, LLC, Wilmington, MA (US)

(72) Inventors: Michael Cyrulik, Sudbury, MA (US); Todd E. Kepple, Litchfield, NH (US); Scott Collins, Westford, MA (US); Jason S. Sirois, Atkinson, NH (US)

(73) Assignee: Symbotic, LLC, Wilmington, MA (US)

( * ) Notice: Subject to any disclaimer, the term of this patent is extended or adjusted under 35 U.S.C. 154(b) by 0 days.

(21) Appl. No.: 15/848,446

(22) Filed: Dec. 20, 2017

(65) Prior Publication Data

US 2018/0111770 A1 Apr. 26, 2018

Related U.S. Application Data

(63) Continuation of application No. 15/003,983, filed on Jan. 22, 2016, now Pat. No. 9,850,079.

(60) Provisional application No. 62/107,135, filed on Jan. 23, 2015.

(51) Int. Cl.
| *B65G 1/04* | (2006.01) |
| *B65G 67/02* | (2006.01) |
| *B65G 1/137* | (2006.01) |

(52) U.S. Cl.
CPC ........... *B65G 67/02* (2013.01); *B65G 1/0492* (2013.01); *B65G 1/1373* (2013.01)

(58) Field of Classification Search
CPC .... B65G 67/02; B65G 1/0492; B65G 1/1373; B65G 1/0414; B65G 1/1375; B65G 1/065
See application file for complete search history.

(56) References Cited

U.S. PATENT DOCUMENTS

| 4,595,329 A | * | 6/1986 | Marques | ............... B65G 1/065 414/267 |
| 4,936,738 A | | 6/1990 | Brennan et al. | |
| 5,380,139 A | | 1/1995 | Pohjonen et al. | |

(Continued)

FOREIGN PATENT DOCUMENTS

| AT | 506221 | 7/2009 |
| CA | 1252430 | 4/1989 |

(Continued)

OTHER PUBLICATIONS

International Search Report, International Application No. PCT/US2016/014747, dated May 17, 2016.

(Continued)

*Primary Examiner* — Kaitlin S Joerger
(74) *Attorney, Agent, or Firm* — Perman & Green, LLP

(57) ABSTRACT

An autonomous transport vehicle includes a frame forming a payload section configured to hold one or more pickfaces, a transfer arm movably mounted to the frame, a drive section connected to the frame, and a controller connected to the drive section, the controller being configured to effect an on-the-fly sortation of pickfaces carried by the autonomous transport vehicle according to a predetermined case out order sequence where the controller commands the drive section so that two or more pickfaces are picked from one or more first case unit holding locations and placed at one or more different second case unit holding locations according to the predetermined case out order sequence.

28 Claims, 23 Drawing Sheets

(56) References Cited

U.S. PATENT DOCUMENTS

| | | | |
|---|---|---|---|
| 6,923,612 B2* | 8/2005 | Hansl | B65G 1/0435 414/277 |
| 7,931,431 B2 | 4/2011 | Benedict et al. | |
| 8,425,173 B2* | 4/2013 | Lert | B65G 1/045 414/280 |
| 8,480,347 B2 | 7/2013 | Schafer | |
| 8,594,835 B2 | 11/2013 | Lert et al. | |
| 8,596,952 B2 | 12/2013 | Wolkerstorfer | |
| 8,740,542 B2* | 6/2014 | Wolkerstorfer | B65G 1/0435 414/280 |
| 8,790,061 B2* | 7/2014 | Yamashita | B65G 1/0492 414/280 |
| 8,894,344 B2 | 11/2014 | Merry et al. | |
| 8,954,188 B2* | 2/2015 | Sullivan | G06Q 10/08 700/214 |
| 8,956,099 B2* | 2/2015 | Olszak | B66F 9/07 414/277 |
| 8,974,168 B2 | 3/2015 | Yamashita | |
| 9,008,884 B2* | 4/2015 | Toebes | B65G 1/0492 701/23 |
| 9,037,286 B2* | 5/2015 | Lert | B65G 1/1378 700/216 |
| 9,315,323 B2 | 4/2016 | Schubilske | |
| 9,321,591 B2* | 4/2016 | Lert | B65G 1/0492 |
| 9,409,728 B2 | 8/2016 | Bastian, II | |
| 9,499,338 B2* | 11/2016 | Toebes | B65G 1/0492 |
| 9,505,556 B2* | 11/2016 | Razumov | B65G 1/1378 |
| 9,555,967 B2 | 1/2017 | Stevens | |
| 9,856,083 B2 | 1/2018 | Conrad et al. | |
| 2003/0185656 A1 | 10/2003 | Hansl | |
| 2004/0197171 A1 | 10/2004 | Freudelsperger | |
| 2006/0245862 A1* | 11/2006 | Hansl | B65G 1/0435 414/281 |
| 2008/0131241 A1 | 6/2008 | King | |
| 2010/0272546 A1* | 10/2010 | Wolkerstorfer | B65G 1/0435 414/277 |
| 2010/0316468 A1 | 12/2010 | Lert et al. | |
| 2010/0316469 A1 | 12/2010 | Lert et al. | |
| 2012/0141236 A1* | 6/2012 | Korner | B65G 1/0407 414/222.01 |
| 2012/0185082 A1 | 7/2012 | Toebes et al. | |
| 2012/0186192 A1 | 7/2012 | Toebes et al. | |
| 2012/0189409 A1 | 7/2012 | Toebes et al. | |
| 2012/0189416 A1* | 7/2012 | Toebes | B65G 1/0492 414/509 |
| 2012/0195720 A1* | 8/2012 | Sullivan | B65G 1/04 414/277 |
| 2012/0330458 A1 | 12/2012 | Weiss | |
| 2013/0129453 A1 | 5/2013 | Salichs et al. | |
| 2013/0209202 A1* | 8/2013 | Schmit | B65G 1/0407 414/279 |
| 2013/0245810 A1 | 9/2013 | Sullivan et al. | |
| 2014/0044506 A1* | 2/2014 | De Vries | B65G 1/0435 414/277 |
| 2014/0056672 A1* | 2/2014 | Mathys | B65G 1/0407 414/277 |
| 2014/0088748 A1 | 3/2014 | Woodtli et al. | |
| 2014/0100999 A1 | 4/2014 | Mountz et al. | |
| 2014/0124462 A1 | 5/2014 | Yamashita | |
| 2014/0277692 A1* | 9/2014 | Buzan | B65G 1/0492 700/216 |
| 2014/0350717 A1 | 11/2014 | Dagle et al. | |
| 2015/0098775 A1* | 4/2015 | Razumov | B65G 1/0407 414/282 |
| 2015/0225187 A1* | 8/2015 | Razumov | B65G 1/0471 414/279 |
| 2016/0016731 A1* | 1/2016 | Razumov | B65G 1/0492 414/279 |
| 2016/0167880 A1* | 6/2016 | Pankratov | B65G 1/0492 414/281 |
| 2016/0207709 A1* | 7/2016 | Pankratov | B65G 1/0492 |
| 2016/0207710 A1 | 7/2016 | Conrad et al. | |
| 2016/0207711 A1* | 7/2016 | Pankratov | B65G 1/1373 |
| 2016/0214797 A1* | 7/2016 | Pankratov | B65G 1/0492 |
| 2016/0214808 A1 | 7/2016 | Cyrulik et al. | |

FOREIGN PATENT DOCUMENTS

| | | |
|---|---|---|
| DE | 2011106677 | 1/2013 |
| EP | 0169156 | 1/1986 |
| GB | 2407656 | 5/2005 |
| WO | 2004103883 | 12/2004 |
| WO | 2009150684 | 12/2009 |
| WO | 2012156355 | 11/2012 |
| WO | 2013004695 | 1/2013 |
| WO | 2014145450 | 9/2014 |
| WO | 20160115565 | 7/2016 |

OTHER PUBLICATIONS

International Search Report, International Application No. PCT/US2015/065574, dated Feb. 12, 2016.

International Search Report, International Application No. PCT/US2016/013877, dated May 20, 2016.

* cited by examiner

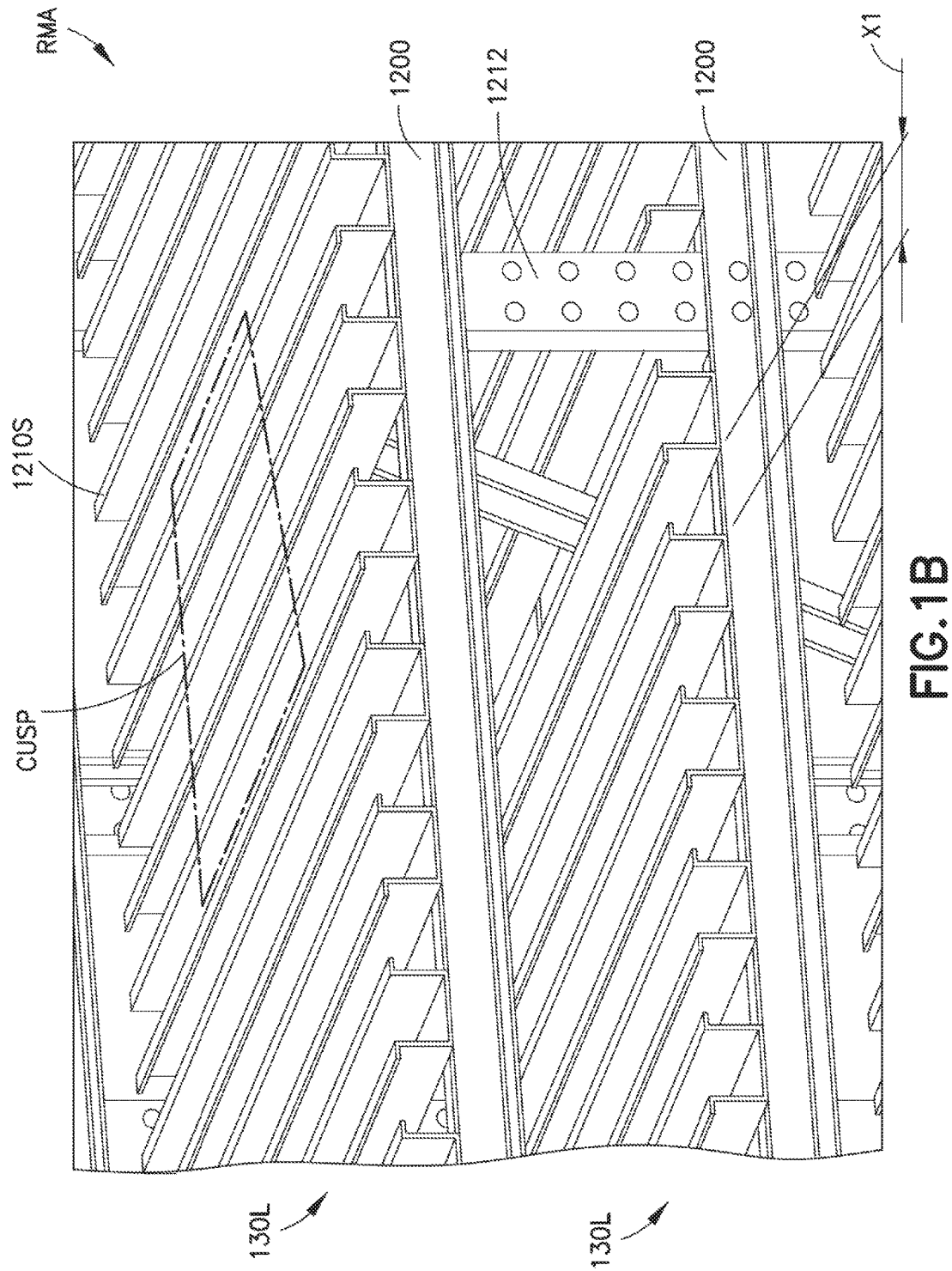

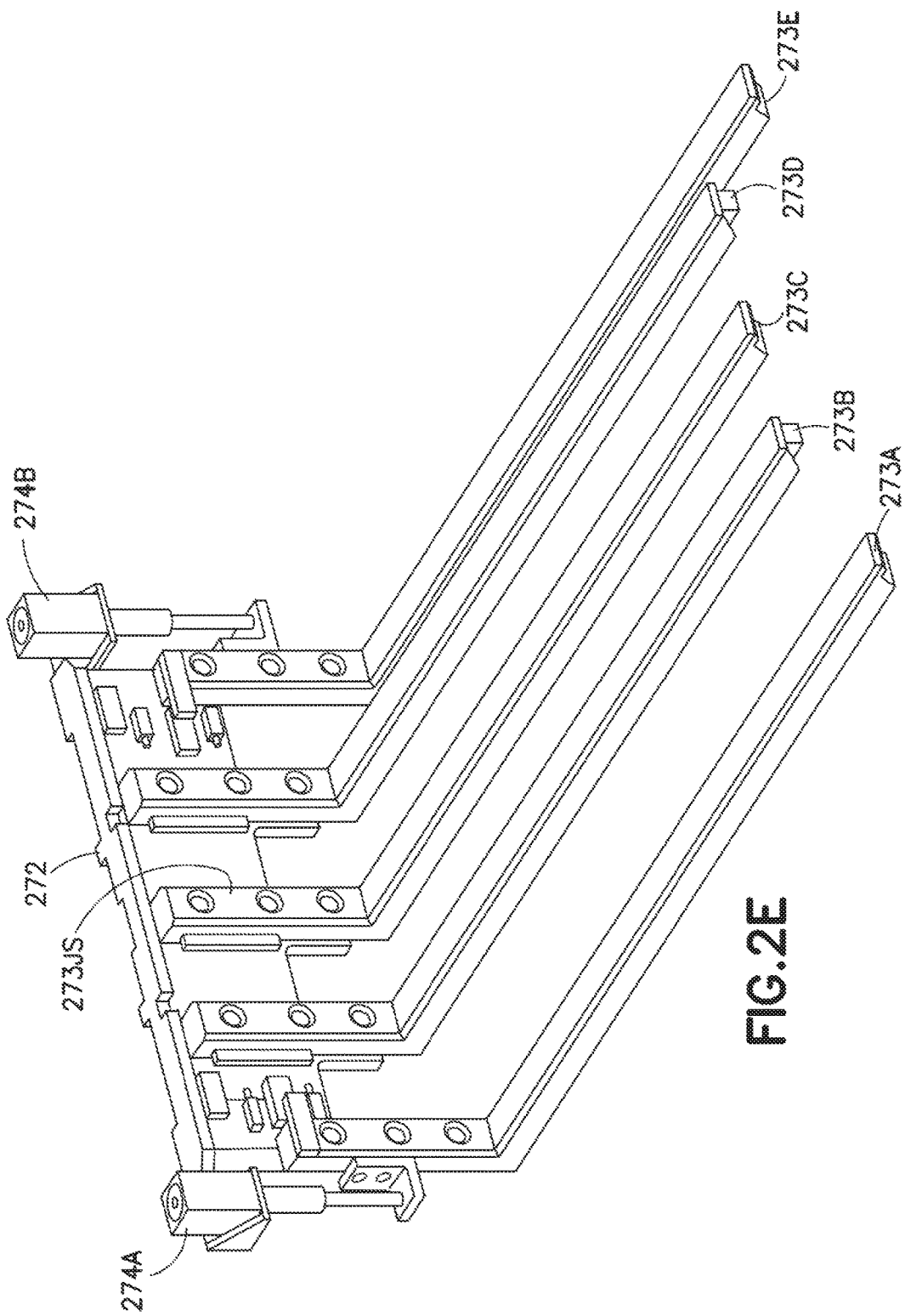

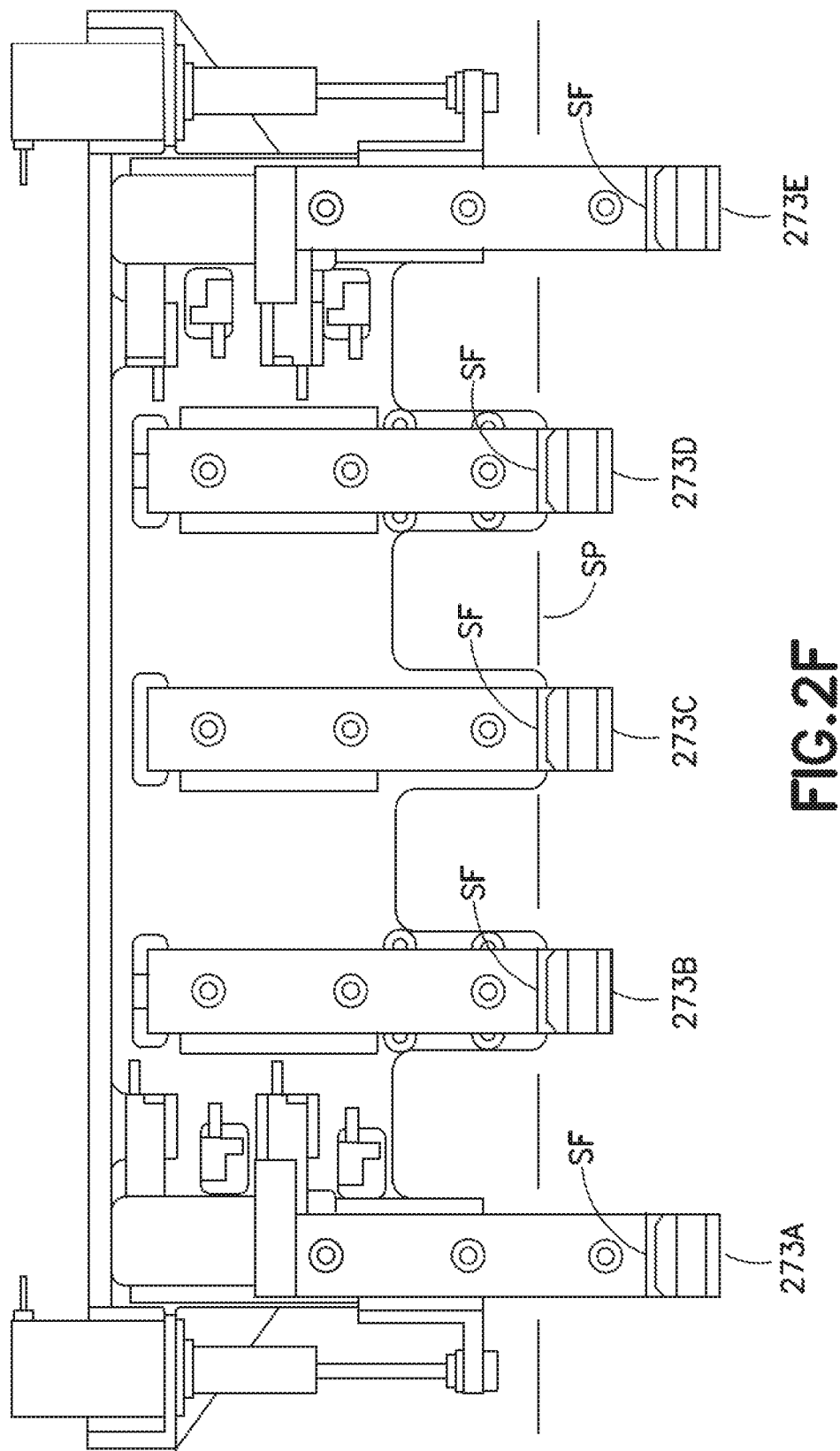

STORAGE AND RETRIEVAL SYSTEM TRANSPORT VEHICLE

CROSS-REFERENCE TO RELATED APPLICATIONS

This application is a continuation of U.S. Non-Provisional patent application Ser. No. 15/003,983, filed on Jan. 22, 2016 (now U.S. Pat. No. 9,850,079, issued Dec. 26, 2017), which claims priority from and the benefit of U.S. Provisional Patent Application No. 62/107,135 filed on Jan. 23, 2015, the disclosures of which are incorporated by reference herein their entireties.

This application is also related to U.S. patent application Ser. No. 14/966,978 filed on Dec. 11, 2015; U.S. patent application Ser. No. 14/997,902 filed on Jan. 18, 2016; U.S. patent application Ser. No. 14/997,925 filed on Jan. 18, 2016; U.S. patent application Ser. No. 14/997,920 filed on Jan. 18, 2016 (now U.S. Pat. No. 9,856,083, issued Jan. 2, 2018); and U.S. patent application Ser. No. 14/997,892 filed on Jan. 18, 2016, the disclosures of which are incorporated herein reference in their entireties.

BACKGROUND

1. Field

The exemplary embodiments generally relate to material handling systems and, more particularly, to transport and sorting of items within the material handling system.

2. Brief Description of Related Developments

Multilevel storage and retrieval systems may e used in warehouses for the storage and retrieval of goods. Generally the transportation of goods into and out of the storage structure is done with lifts for transfer to a vehicle on a storage level, vehicles travelling up ramps to a predetermined storage level, or with vehicles that include lifts traveling along guide ways. Throughput of these storage and retrieval systems may be limited by one or more of the retrieval of the goods at a storage level and the transfer of goods between storage levels.

It would advantageous to increase vehicle payload handling throughput by combining movement of payload handling manipulation axes of a transport vehicle and sorting of payloads on the transport vehicle.

BRIEF DESCRIPTION OF THE DRAWINGS

The foregoing aspects and other features of the disclosed embodiment are explained in the following description, taken in connection with the accompanying drawings, wherein:

FIGS. 1A and 1B are schematic illustrations of portions of the automated storage and retrieval system in accordance with aspects of the disclosed embodiment;

FIGS. 2A-2F are schematic illustrations of portions of the transport vehicle in accordance with aspects of the disclosed embodiment;

DETAILED DESCRIPTION

Figure 1:
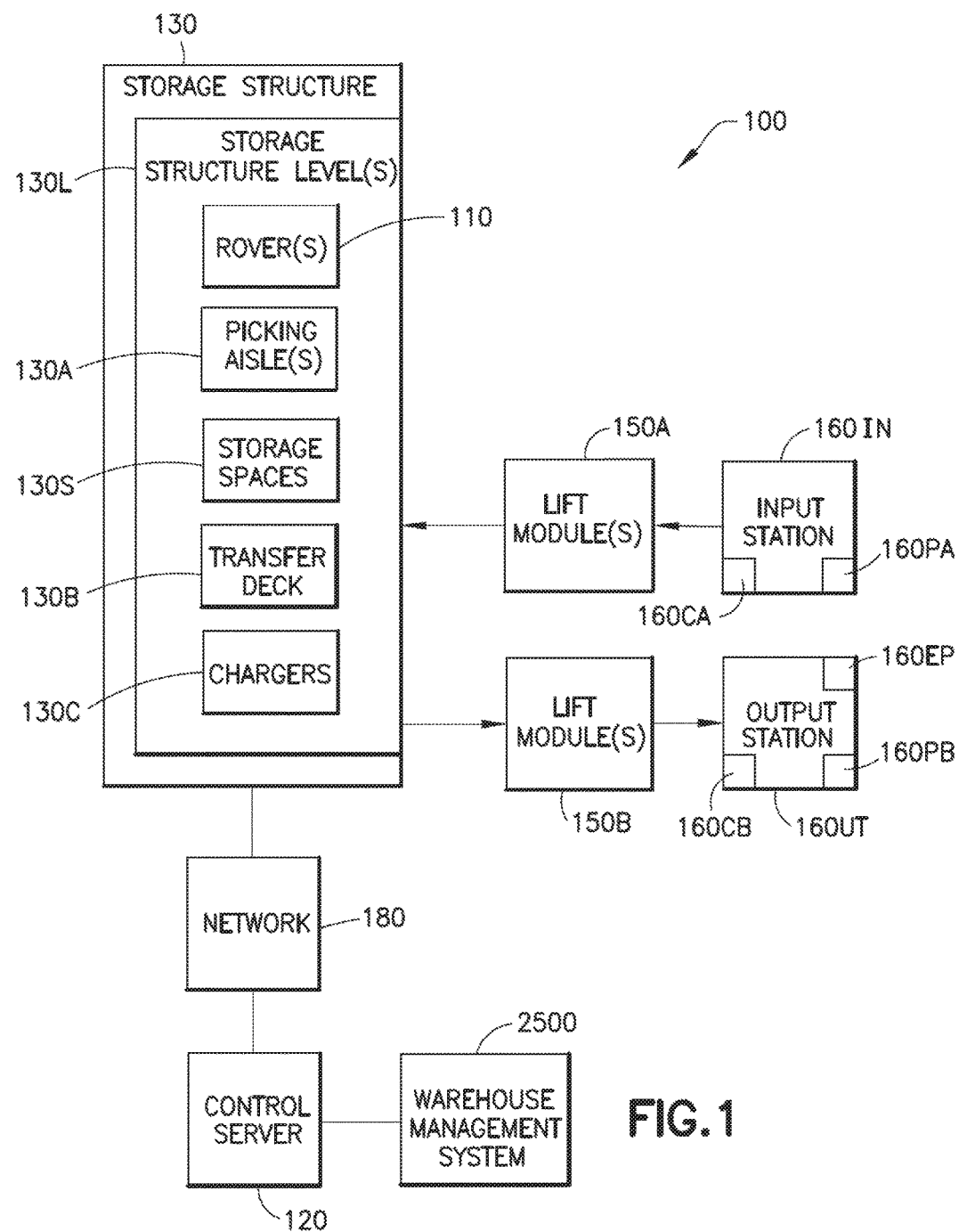
FIG. 1 is a schematic illustration of an automated storage and retrieval system accordance with aspects of the disclosed embodiment.

FIG. 1 is a schematic illustration of an automated storage and retrieval system 100 in accordance with aspects of the disclosed embodiment. Although the aspects of the disclosed embodiment will be described with reference to the drawings, it should be understood that the aspects of the disclosed embodiment can be embodied many forms. In addition, any suitable size, shape or type of elements or materials could be used.

Figure 15:
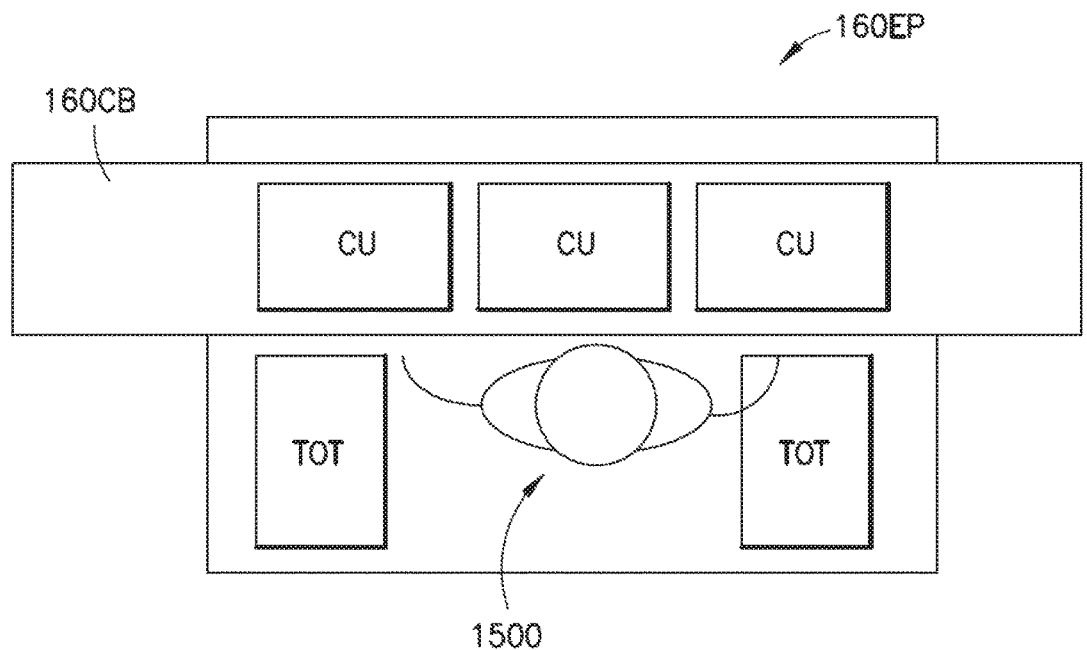
FIG. 15 is a schematic illustration of an operator station of the storage and retrieval system in accordance with aspects of the disclosed embodiment.

In accordance with aspects of the disclosed embodiment the automated storage and retrieval system 100 may operate in a retail distribution center or warehouse to, for example, fulfill orders received from retail stores for case units such as those described in U.S. patent application Ser. No. 13/326,674 filed on Dec. 15, 2011, the disclosure of which is incorporated by reference herein in its entirety. For example, the case units are cases or units of goods not stored in trays, on totes or on pallets (e.g. uncontained). In other examples, the case units are cases or units of goods that are contained in any suitable manner such as in trays, on totes or on pallets. In still other examples, the case units are a combination of uncontained and contained items. It noted that the case units, for example, include cased units of goods (e.g. case of soup cans, boxes of cereal, etc.) or individual goods that are adapted to be taken off of or placed on a pallet. In accordance with the aspects of the disclosed embodiment, shipping cases for case units (e.g. cartons, barrels, boxes, crates, lugs, or any other suitable device for holding case units) may have variable sizes and may be used to hold case units in hipping and may be configures so they are capable of being palletized for shipping. It is noted that when, for example, bundles or pallets of case units arrive at the storage and retrieval system the content of each pallet may be uniform (e.g. each pallet holds a predetermined number of the same item—one pallet holds soup and another pallet holds cereal) and as pallets leave the storage and retrieval system the pallets may contain any suitable number and combination of different case units (e.g. a mixed pallet where each mixed pallet holds different types of case units—a pallet holds a combination of soup and cereal) that are provided to, for example the palletizer in a sorted arrangement for forming the mixed pallet. In the embodiments the storage and retrieval system described herein may be applied to any environment in which case units are stored and retrieved. As may also be realized, as illustrated in FIG. 15, in one aspect of the disclosed embodiment the system 100 operating for example as a retail distribution center may server to receive uniform pallet loads of cases, breakdown the pallet goods or disassociate the cases from the uniform pallet loads into independent case its handled individually by the system, retrieve and sort the different cases sought by each order into corresponding groups, and transport and sequence the corresponding groups of cases (in the manner described herein) at an operator station 160EP where items are picked from the different case units CU, and/or the different case units CU themselves, are placed in one or more bag(s), tote(s) or other suitable container(s) TOT by an operator 1500, or any suitable automation, in a predetermined order sequence of picked items according to, for example, an order, fulfilling one or more customer orders, in which the case units CU are sequenced at the operator station 160EP, noting that the sequencing of the case units CU as described herein effects the sequencing of the case units at the operator station 160EP.

The automated storage and retrieval system 100 may include input stations 160IN (which include depalletizers 160PA and/or conveyors 160CA for transporting items to lift modules for entry into storage) and output stations 160UT (which include palletizers 160PB, operator stations 160EP and/or conveyors 160CB for transporting case units from lift modules for removal from storage), input and output vertical lift modules 150A, 150B (generally referred to as lift modules 150—it is noted that while input and output lift modules are shown, a single lift module may be used to both input and remove case units from the storage structure), a storage structure 130, and a number of autonomous rovers or transport vehicles 110 (referred to herein as "bots"). It is noted that the depalletizers 160PA may be configured to remove case units from pallets so that the input station 160IN can transport the items to the lift modules 150 for input into the storage structure 130. The palletizers 160PB may be configured to place items removed from the storage structure 130 on pallets for shipping.

The storage structure 130 may include multiple storage rack modules configured in a three dimensional array RMA that are accessible by storage or deck levels 130L. Each storage level 130L includes storage spaces 130S formed by the rack modules where the rack modules include shelves that are disposed along storage or picking aisles 130A which, e.g., extend linearly through the rack module array and provide access to the storage spaces 130S and transfer decks 130B over which the bots 110 travel on a respective storage level 130L for transferring case units between any of the storage spaces 130S of the storage structure 130 (e.g. on the level which the bot 110 is located) and any of the lift modules 150 (e.g. each of the bots 110 has access to each storage space 130S on a respective level and each lift module 150 on a respective storage level 130L). The transfer decks 130B are arranged at different levels (corresponding to each level 130L of the storage and retrieval system) that may be stacked one over the other or horizontally offset, such as having one transfer deck 130B at one end or side of the storage rack array or at several ends or sides of the storage rack array as described in, for example, U.S. patent application Ser. No. 13/326,674 filed on Dec. 15, 2011 the disclosure of which is incorporated herein by reference in its entirety. The transfer decks 130B are substantially open and configured for the undeterministic traversal of bots 110 across and along the transfer decks 130B. As may be realized, the transfer deck(s) 130B at each storage level 130L communicate with each of the picking aisles 130A on the respective storage level 130L, and bots 110 bi-directionally traverse between the transfer deck(s) 130B and picking aisles 130A on each storage level 130L to access the storage spaces 130S disposed in the rack shelves alongside each of the picking aisles 130A (e.g. bots 110 may access storage spaces 130S distributed on both sides of each aisle such that the bot 110 may have a different facing, as will be described in greater detail below, when traversing each picking aisle 130A). As noted above, the transfer deck(s) 130B also provide bot 110 access to each of the lifts 150 on the respective storage level 130L where the lifts 150 feed and remove case units to and/or from each storage level 130L where the bots 110 effect case unit transfer between the lifts 150 and the storage spaces 130S. Each storage level 130L may also include charging stations 130C for charging an on-board power supply of the hots 110 on that storage level 130L such as described in, for example, U.S. patent application Ser. No. 14/209,086 filed on Mar. 13, 2014 and Ser. No. 13/325,823 filed on Dec. 15, 2011 the disclosures of which are incorporated herein by reference in their entireties.

The bots 110 may be any suitable independently operable autonomous transport vehicles that carry and transfer case units throughout the storage and retrieval system 100. In one aspect the bots 110 are automated, independent (e.g. free riding) autonomous transport vehicles. Suitable examples of bots can be found in, for exemplary purposes only, U.S. patent application Ser. No. 13/326,674 filed on Dec. 15, 2011; U.S. patent application Ser. No. 12/757,312 filed on Apr. 9, 2010 (now U.S. Pat. No. 8,425,173); U.S. patent application Ser. No. 13/326,423 filed on Dec. 15, 2011; U.S. patent application Ser. No. 13/326,447 filed on Dec. 15, 2011 (now U.S. Pat. No. 8,965,619); U.S. patent application Ser. No. 13/326,505 Dec. 15, 2011 (now U.S. Pat. No. 8,696,010); U.S. patent application Ser. No. 13/327,040 filed on Dec. 15, 2011 (now U.S. Pat. No. 9,187,244); U.S. patent application Ser. No. 13/326,952 filed Dec. 15, 2011; U.S. patent application Ser. No. 13/326,993 filed on Dec. 15, 2011; and U.S. patent application Ser. No. 14/486,008 filed on Sep. 15, 2014, the disclosures of which are incorporated by reference herein in their entireties. The bots 110 may be configures to place case units, such as the above described retail merchandise, into picking stock in the one or more levels of the storage structure 130 and then selectively retrieve ordered case units, e.g. according to a predetermined order out sequence, for shipping the ordered case units to, for example, a store or other suitable location. The order out sequence, in one aspect, corresponds to an order in which the case units (or pickfaces as will be described below) are needed for placement on an outbound pallet or in any other suitable transport device such as one or more bag(s), tote(s), shopping carriage(s), truck(s) or other suitable container fill without palletization. In other aspects the order out sequence may be any suitable predetermined sequence in which the case units or pickfaces are to be delivered to the output station by the bots 110.

The bots 110, lift modules 150 and other suitable features of the storage and retrieval system 100 are controlled by, for example, one or more central system control computers (e.g. control server) 120 through, for example, any suitable network 180. In one aspect the network 180 is a wired network, a wireless network or a combination of wireless and wired networks using any suitable type and/or number of communication protocols. In one aspect, the control server 120 includes a collection of substantially concurrently running programs (e.g. system management software) for substantially automatic control of the automated storage and retrieval system 100. The collection of substantially concurrently running programs, for example, being configured to manage the storage and retrieval system 100 including, for exemplary purposes only, controlling, scheduling, and monitoring the activities of all active system components, managing inventory (e.g. which case units are input and removed, the order in which the cases are removed and where the case units are stored) and pickfaces (e.g. one or more case units that are movable as a unit and handled as a unit by components of the storage and retrieval system), and interfacing with a warehouse management system 2500. The control server 120 may, in one aspect, be configured to control the features of the storage and retrieval system in the manner described herein. For simplicity and ease of explanation the term "case unit(s)" is generally used herein for referring to both individual case units and pickfaces.

Figure 2:
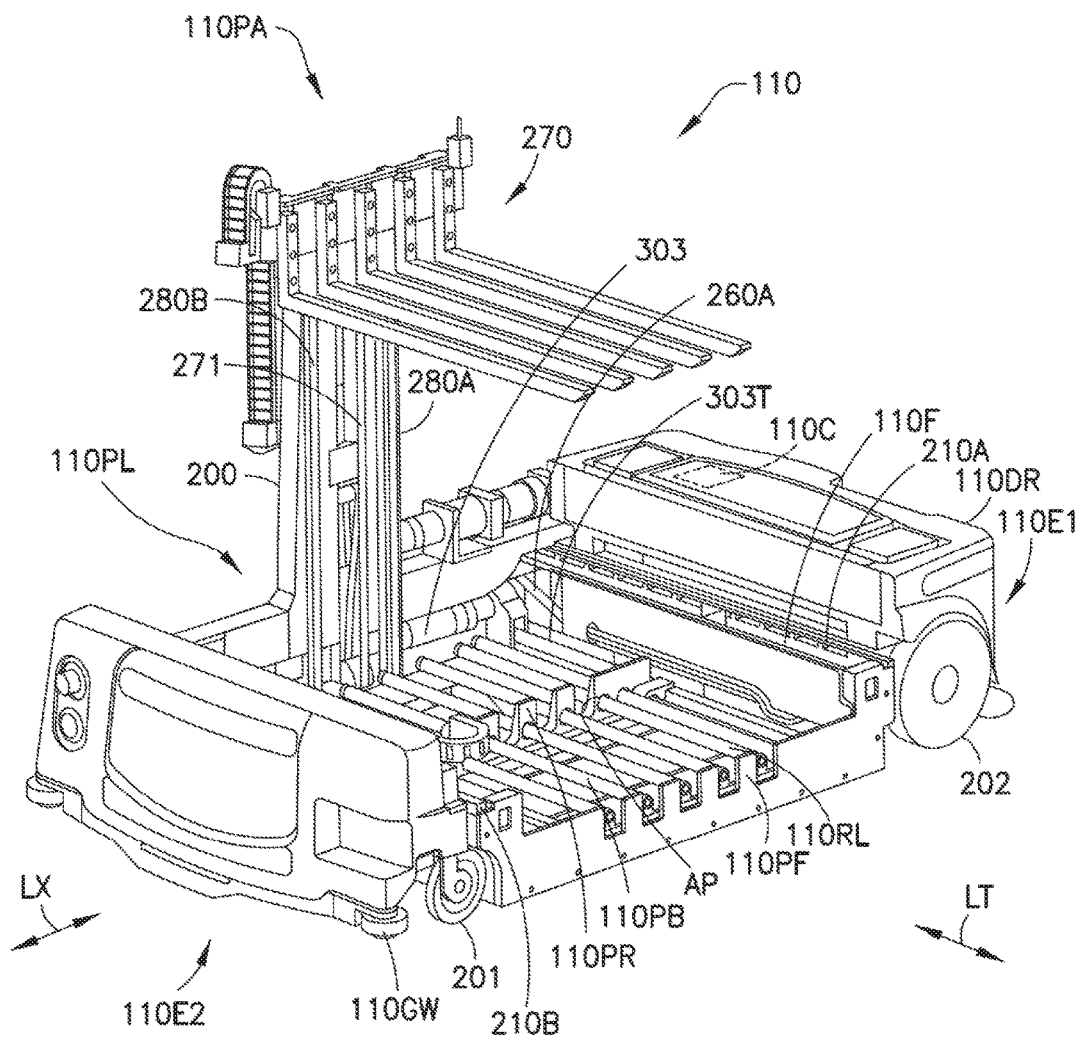
FIG. 2 is a schematic illustration of a transport vehicle in accordance with aspects of the disclosed embodiment.

Referring now to FIG. 2, the bots 110, as noted above, transport case units between each lift module 150 and each storage space 130S on a respective storage level 130L. The bots 110 include a frame 110F having a drive section 110DR and a payload section 110PL. The drive section 110DR includes one or more drive wheel motors each connected to a respective drive wheel(s) 202. In this aspect the bot 110 includes two drive wheels 202 located on opposite sides of the bot 110 at end 110E1 (e.g. first longitudinal end) of the bot 110 for supporting the bot 110 on a suitable drive surface however, in other aspects any suitable number of drive wheels are provided on the bot 110. In one aspect each drive wheel 202 is independently controlled so that the bot 110 may be steered through a differential rotation of the drive wheels 202 while in other aspects the rotation of the drive wheels 202 may be coupled so as to rotate at substantially the same speed. Any suitable wheels 201 are mounted to the frame on opposite sides of the bot 110 at end 110E2 (e.g. second longitudinal end) of the bot 110 for supporting the bot 110 on the drive surface. In one aspect the wheels 201 are caster wheels that freely rotate allowing the bot 110 to pivot through differential rotation of the drive wheels 202 for changing a travel direction of the bot 110. In other aspects the wheels 201 are steerable wheels that turn under control of, for example, a bot controller 1100 (which is configured to effect control of the bot 110 as described herein) for changing a travel direction of the bot 110. In one aspect the bot 110 includes one or more guide wheels 110GW located at, for example, one or more corners of the frame 110F. The guide wheels 110GW may interface with the storage structure 130, such as guide rails (not shown) within the picking aisles 130A, on the transfer deck 130B and/or at transfer stations for interfacing with the lift modules 150 for guiding the bot 110 and/or positioning the bot 110 a predetermined distance from a location to/from which one or more case units are placed and/or picked up as described in, for example, U.S. patent application Ser. No. 13/326,423 filed on Dec. 15, 2011 the disclosure of which is incorporated herein by reference in its entirety. As noted above, the bots 110 may enter the picking aisles 130A having different facing directions for accessing storage spaces 130S located on both sides of the picking aisles 130A. For example, the bot 110 may enter a picking aisle 130A with end 110E2 leading the direction of travel or the bot may enter the picking aisle 130A with end 110E1 leading the direction of travel.

The payload section 110PL of the bot 110 includes a payload bed 110PB, a fence or datum member 110PF, a transfer arm 110PA and a pusher bar or member 110PR. In one aspect the payload bed 110PB includes one or more rollers 110RL that are transversely mounted (e.g. relative to a longitudinal axis LX or X direction of the bot 110) to the frame 110F so that one or more case units carried within the payload section 110PL can be longitudinally moved (e.g. justified with respect to a predetermined location of the frame/payload section and/or a datum reference of one or more case units) along the longitudinal axis of the bot, e.g., to position the case unit at a predetermined position within the payload section 110PL and/or relative to other case units within the payload section 110PL (e.g. longitudinal forward/aft justification of case units). In one aspect the rollers 110RL may be driven (e.g. rotated about their respective axes) by any suitable motor for moving the case units within the payload section 110PL. In other aspects the bot 110 includes one or more longitudinally movable pusher bar (not shown) for pushing the case units over the rollers 110RL for moving the case unit(s) to the predetermined position within the payload section 110PL. The longitudinally movable pusher bar may be substantially similar to that described in, for example, U.S. patent application Ser. No. 13/326,952 filed on Dec. 15, 2011, the disclosure of which was previously incorporated by reference herein in its entirety.

Figure 1A:
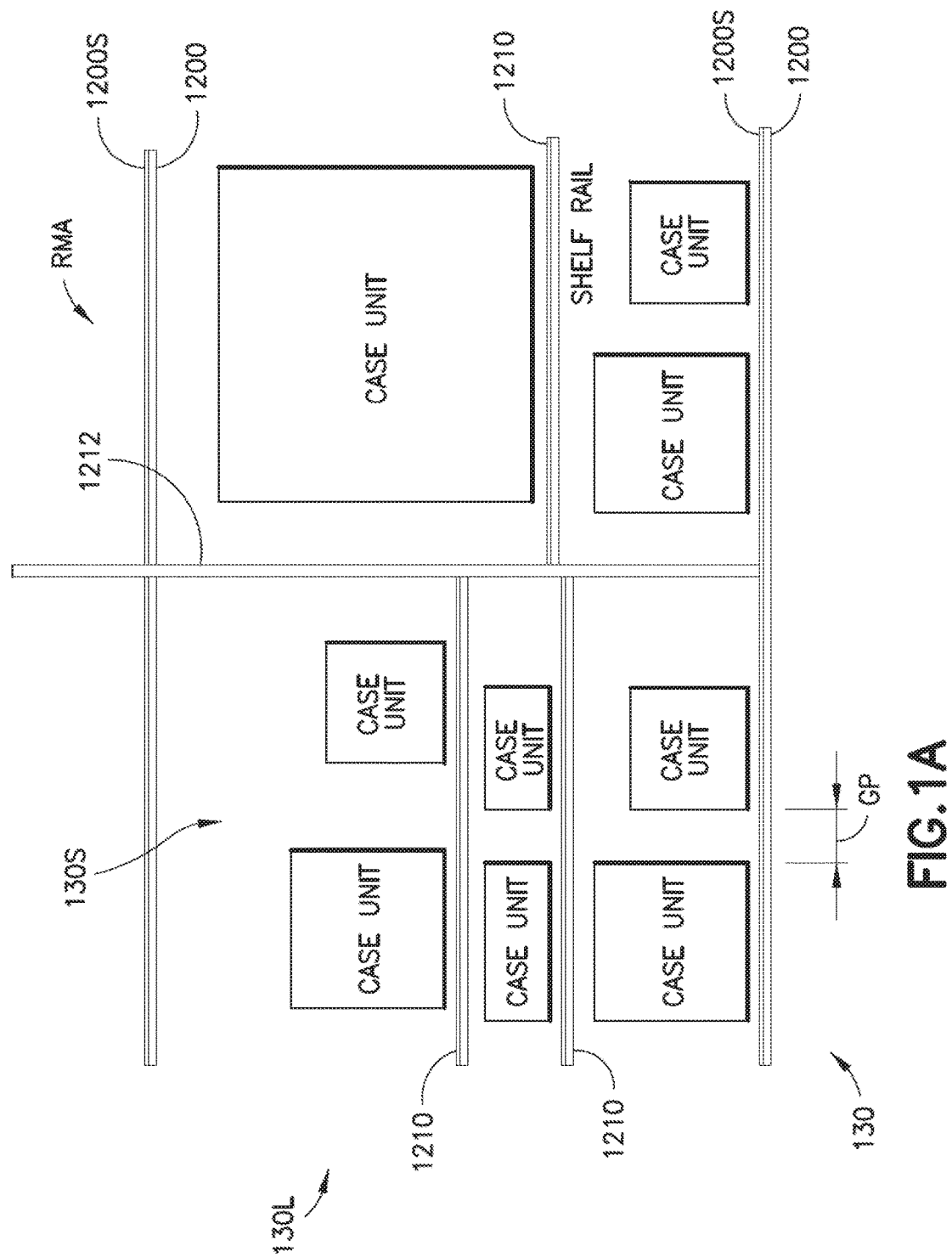
Figure 2A:
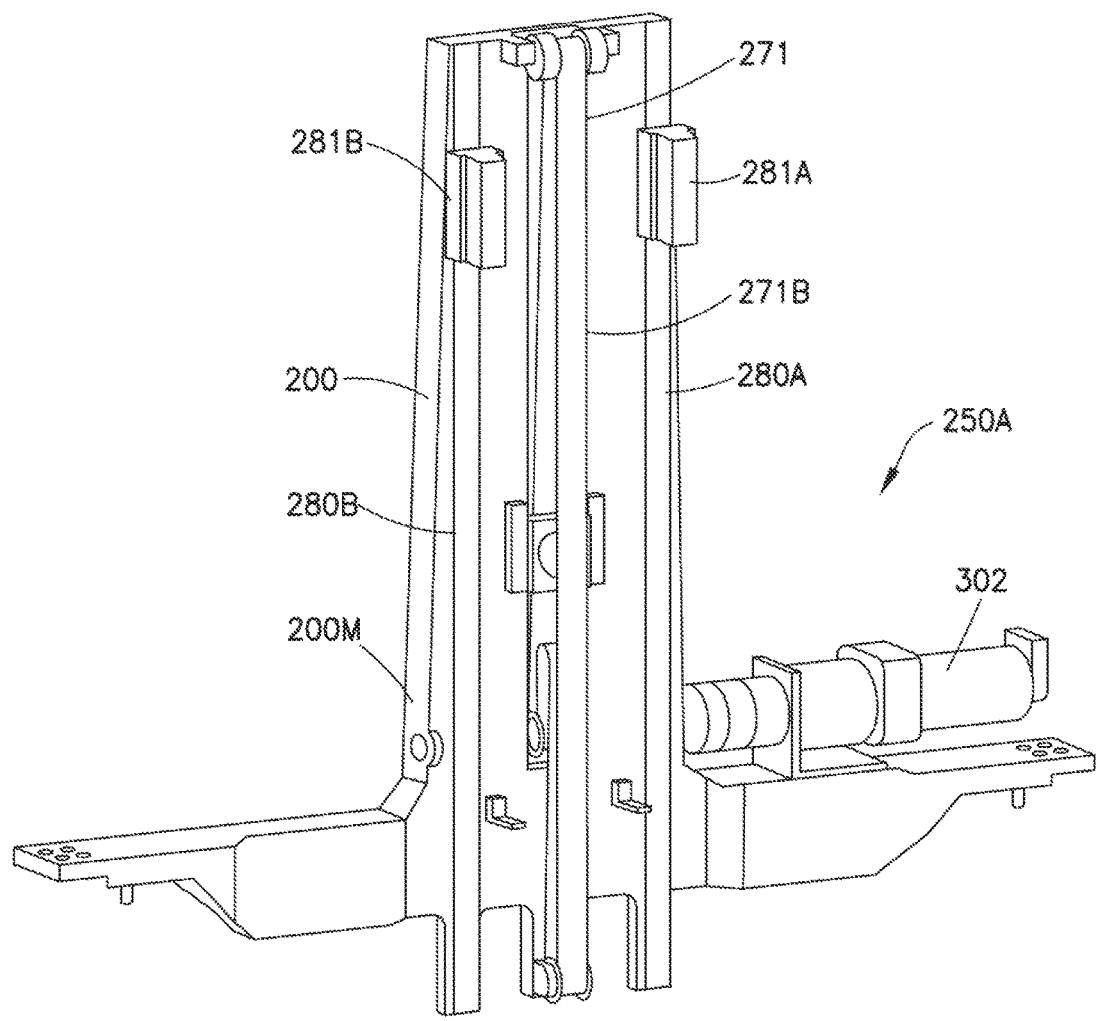
Figure 2B:
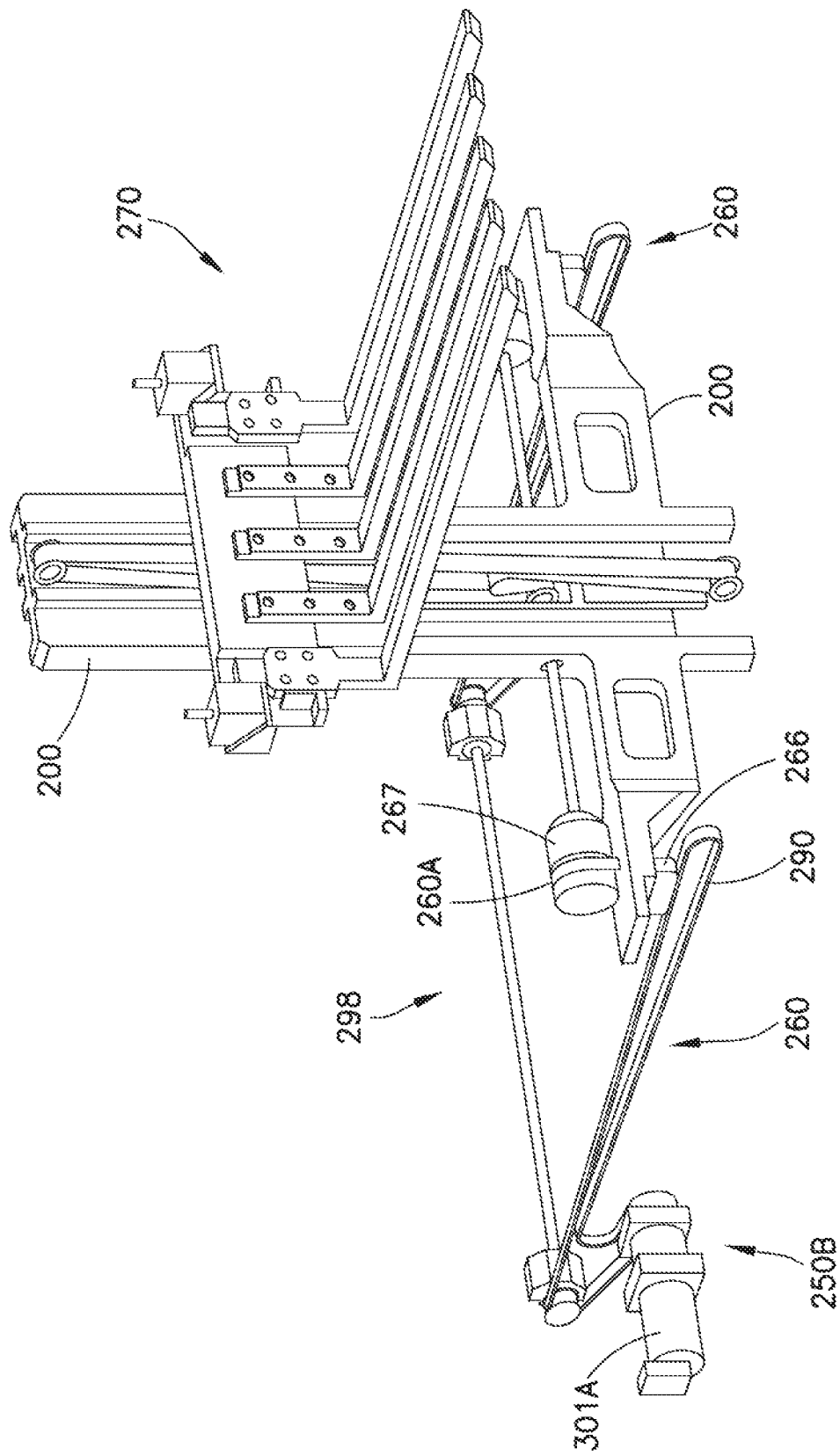
Figure 3:
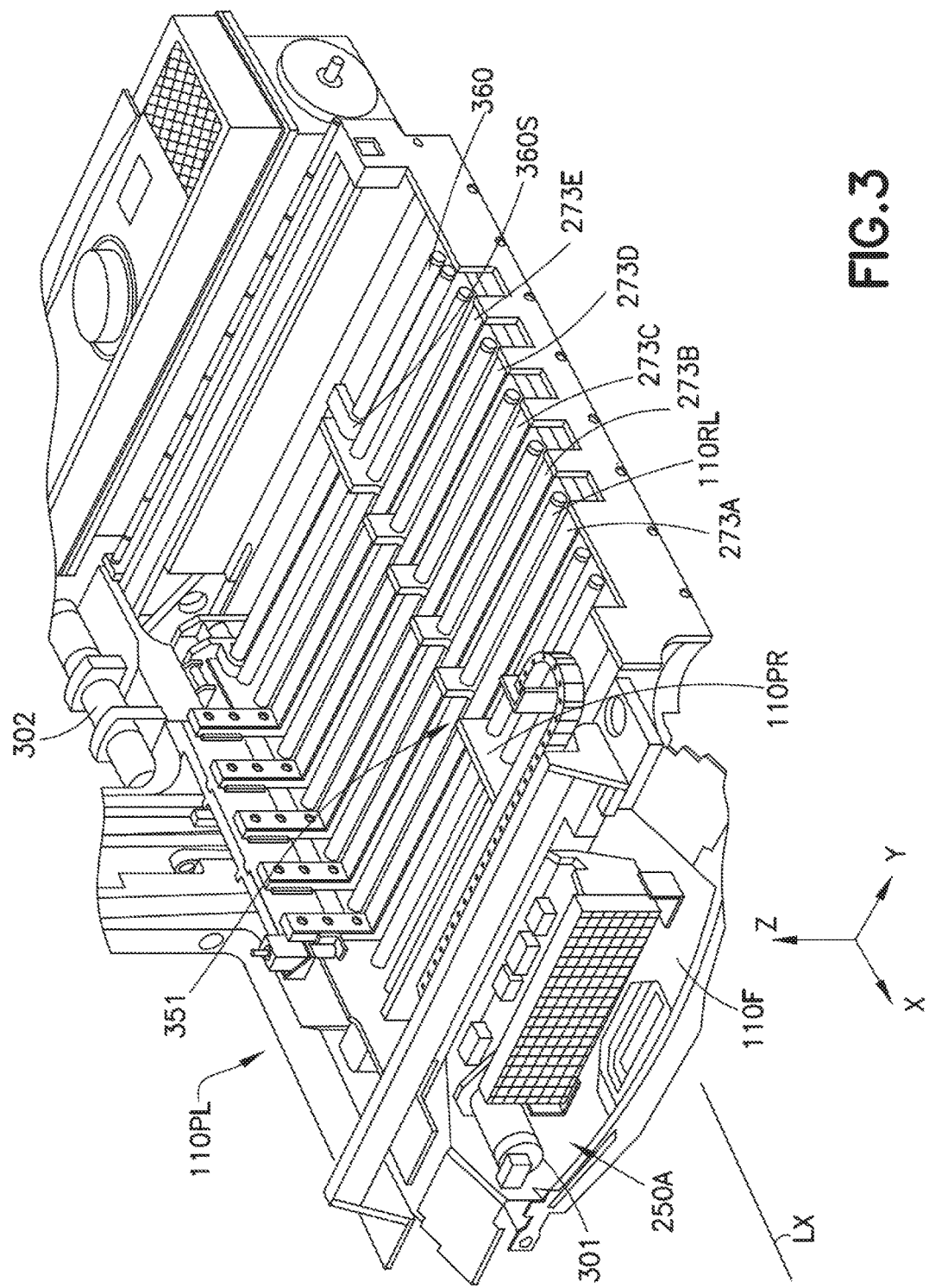
FIG. 3 is a schematic illustration of a portion of the transport vehicle of FIG. 2 in accordance with aspects of the disclosed embodiment.

Referring also to FIGS. 2A and 2B and 3, the case units are placed on the payload bed 110PB and removed from the payload bed 110PB with the transfer arm 110PA. The transfer arm 110PA includes a lift mechanism or unit 200 located substantially within the payload section 110PL. The lift mechanism 200 provides both gross and fine positioning of pickfaces carried by the bot 110 which are to be lifted vertically into position in the storage structure 130 for picking and/or placing the pickfaces and/or individual case units to the storage spaces 130S (e.g. on a respective storage level 130L on which the bot 110 is located). Referring also to FIG. 1A the rack module array RMA of the storage structure 130 includes vertical support members 1212 and horizontal support members 1200. Rails 1200S may be mounted to one or more of the vertical and horizontal support members 1212, 1200 in, for example, picking aisles 130A and be configured so that the bots 110 ride along the rails 1200S through the picking aisles 130A. The picking aisles 130A of each storage level 130L may have one or more storage shelf levels accessible by the bot from the rails 1200S (e.g. from a common picking aisle deck). As can be seen in FIGS. 1A and 1B there are one or more shelf rails 1210 vertically spaced (e.g. in the Z direction) from one another to form multiple stacked storage spaces 130S each being accessible by the bot 110 from the common rails 1200S. As may be realized, the horizontal support members 1200 also form shelf rails (in addition to shelf rails 1210) on which case units are placed.

The lift mechanism 200 is configured so that combined robot axis moves are performed (e.g. combined substantially simultaneous movement of the pusher bar 110PR, lift mechanism 200, pick head extension and fore/aft justification mechanism(s) such as, e.g., the longitudinally movable pusher bar described above), so that different/multi-sku payload are handled by the bot, and/or so that a single drive effects both a lifting (e.g. vertical movement) and an extension (e.g. lateral movement) of the arm 110PA. FIGS. 2A and 2B are schematic illustrations of the lifting mechanism 200 removed from the frame 110F. The actuation of the lifting mechanism 200 is independent of actuation of the pushes bar 110PR as will be described below. The decoupling of the lift mechanism 200 and pusher bar 110PR axes provides for combined pick/place sequences effecting a decreased pick/place cycle time, increased storage and retrieval system throughput and/or increased storage density of the storage and retrieval system. For example, the lift mechanism 200 provides for picking and placing case units at multiple elevated storage shelf levels accessible from a common picking aisle deck (see FIG. 1A and as described in, for example, U.S. patent application Ser. No. 14/966,978 filed on Dec. 11, 2015 and U.S. Provisional Patent Application No. 62/091,162 filed on Dec. 12, 2014, the disclosures of which are incorporated by reference herein in their entireties). The lift mechanism 200 also provides for the simplification and reduction of mechanical components (e.g., motors for driving the lift and extension axes of the transfer arm are located off of the pick head 270) which yields gains in reducing weight of the bot 110 and increasing the mechanical stroke of the transfer arm 110PA in the z and/or y (e.g. lateral) directions.

The lifting mechanism may be configured in any suitable manner so that a pick head 270 of the bot 110 bi-directionally moves along the Z axis (e.g. reciprocates in the Z direction—see FIG. 2). In one aspect, the lifting mechanism includes a mast 200M and the pick head 270 is movably mounted to the mast 200M in any suitable manner. The mast is movably mounted to the frame in any suitable manner so as to be movable along the lateral axis LT (e.g. the Y direction) of the bot 110. In one aspect the frame includes guide rails 210A, 210B to which the mast 200 is slidably mounted. A transfer arm drive 250A (see FIGS. 2A and 3), 250B may be mounted to the frame for effecting at least movement of the transfer arm 110PA along the lateral axis LT (e.g. Y axis) and the Z axis. Referring to FIGS. 2, 2A and 3, in one aspect the transfer arm drive 250A, 250B includes an extension motor 301 and a lift motor 302. The extension motor 301 may be mounted to the frame 110F and coupled to the mast 200M in any suitable manner such as by a belt and pulley transmission 260A (similar to belt and pulley transmission 260B described below), a screw drive transmission (not shown) and/or a gear drive transmission (not shown). The lift motor 302 may be mounted to the mast 200M and coupled to pick head 270 by any suitable transmission, such as by a belt and pulley transmission 271, a screw drive transmission (not shown) and/or a gear drive transmission (not shown). As an example, the mast 200M includes guides, such as guide rails 280A, 280B, along which slide members 281A, 281B ride. The pick head 270 is mounted to the slides 281A, 281B for guided movement in the Z direction along the guide rails 280A, 280B. In other aspects the pick head is mounted to the mast in any suitable manner for guided movement in the Z direction. The belt 271B of the belt and pulley transmission 271 is fixedly coupled to the pick head 270 so that as the belt 271 moves (e.g. is driven by the motor 302) the pick head 270 moves with the belt 271 and is bi-directionally driven along the guide rails 280A, 280B in the Z direction. As may be realized, where a screw drive is employed to drive the pick head 270 in the Z direction, a nut may be mounted to the pick head 270 so that as a screw is turned by the motor 302 engagement between the nut and screw causes movement of the pick head 270. Similarly, where a gear drive transmission is employed a rack and pinion or any other suitable gear drive may drive the pick head 270 in the Z direction. In other aspects any suitable linear actuators are used to move the pick head in the Z direction.

Referring again to FIGS. 2, 2A, 2B and 3, as described above, the lifting of the pick head 270 and lateral extension of the transfer arm 110PA is provided by lift motor 302 and extension motor 301. In other aspects the lifting of the pick head 270 and lateral extension of the transfer arm 110PA may be provided by a remotely actuated brake mechanism 298 such that a single motor 301A moves the pick head 270 in the Z direction and laterally extends the transfer arm 110PA (e.g. by laterally moving the mast 200M). For example, the remotely actuated brake mechanism 298 is configured to selectively switch (e.g. under the control of the bot controller 110C) between drive belts 260, 271B for selectively lifting/lowering the pick head 270 and laterally extending the transfer arm 110PA. As may be realized, a single motor effecting both lifting/lowering and extension of the transfer arm 110PA reduces a number of mechanical components and electrical interfaces of the bot 110 as well as reduces the weight of the bot 110. With the remotely actuated brake mechanism 298 the lateral extension of the transfer arm 110PA may be substantially similar to that described above with motor 301, e.g., where the motor 301A drives a belt and pulley transmission 260A. The mast 200M may be fixedly coupled to the belt 260 so that as the belt is driven by the motor 301A the mast 200M moves with the belt 260. A brake mechanism 266 may be connected to the controller 110C and be configured to effect selective disengagement of the mast 200M from the belt 260 and laterally fix the mast 200M at a predetermined lateral position. As may be realized, any suitable sensors and/or encoders may be provided and connected to the controller 110C to sense or otherwise detect a lateral position of the mast 200M (and hence the pick head 270) relative to the frame 110F and/or a case unit pick/place location. The brake mechanism 266 also includes a transmission that selectively couples (e.g. when belt 260 is decoupled from the mast 200M) the belt 260 to belt 260A. Belt 260A is coupled, via the brake mechanism 266, to and drives a lift transmission 267 mounted to the mast 200M. The lift transmission 267 is coupled to the belt 271B such as through pulleys for lifting lowering the pick head 270 in the Z direction.

Referring now to FIGS. 2C-2F the pick head 270 of the bot 110 transfers case units between the bot 110 and a case unit pick/place location such as, for example, the storage spaces 130S and/or interfaces between the bot 110 and a lift module 150 (such as the interfaces described in, for example, U.S. Provisional Patent Application No. 62/104,520 filed on Jan. 16, 2015, the disclosure of which is incorporated by reference herein in its entirety). In one aspect, the pick head 270 includes a base member 272, one or more tines or fingers 273A-273E and one or more actuators 274A, 274B. The base member 272 is mounted to the mast 200M, as described above, so as to ride along the guide rails 280A, 280B. The one or more tines 273A-273E are mounted to the base member 272 at a proximate end of the tines 273A-273E so that a distal end of the tines 273A-273E (e.g. a free end) is cantilevered from the base member 272. Referring again to FIG. 1B, the tines 273A-273E are configured for insertion between slats 1210S that form a case unit support plane CUSP of the storage shelves.

One or more of the tines 273A-273E is movably mounted to the base member 272 (such as on a slide/guide rail similar to that described above) so as to be movable in the Z direction. In one aspect any number of tines are mounted to the base member 272 while in the aspect illustrated in the figures there are, for example, five tines 273A-273E mounted to the base member 272. Any number of the tines 273A-273E are movably mounted to the base member 272 while in the aspect illustrated in the figures, for example, the outermost (with respect to a centerline CL of the pick head 270) tines 273A, 273E are movably mounted to the base member 272 while the remaining tines 273B-273D are immovable relative to the base member 272.

In this aspect the pick head 270 employs as few as three tines 273B-273D to transfer smaller sized case units (and/or groups of case units) to and from the bot 110 and as many as five tines 273A-273E to transfer larger sized case units (and/or groups of case units) to and from the bot 110. In other aspects, less than three tines are employed (e.g. such as where more than two tines are movably mounted to the base member 272) to transfer smaller sized case units. For example, in one aspect all but one tine 273A-273E is movably mounted to the base member so that the smallest case unit being transferred to and from the bot 110 without disturbing other case units on, for example, the storage shelves has a width of about the distance X1 between slats 1210S (see FIG. 1B).

Figure 2C:
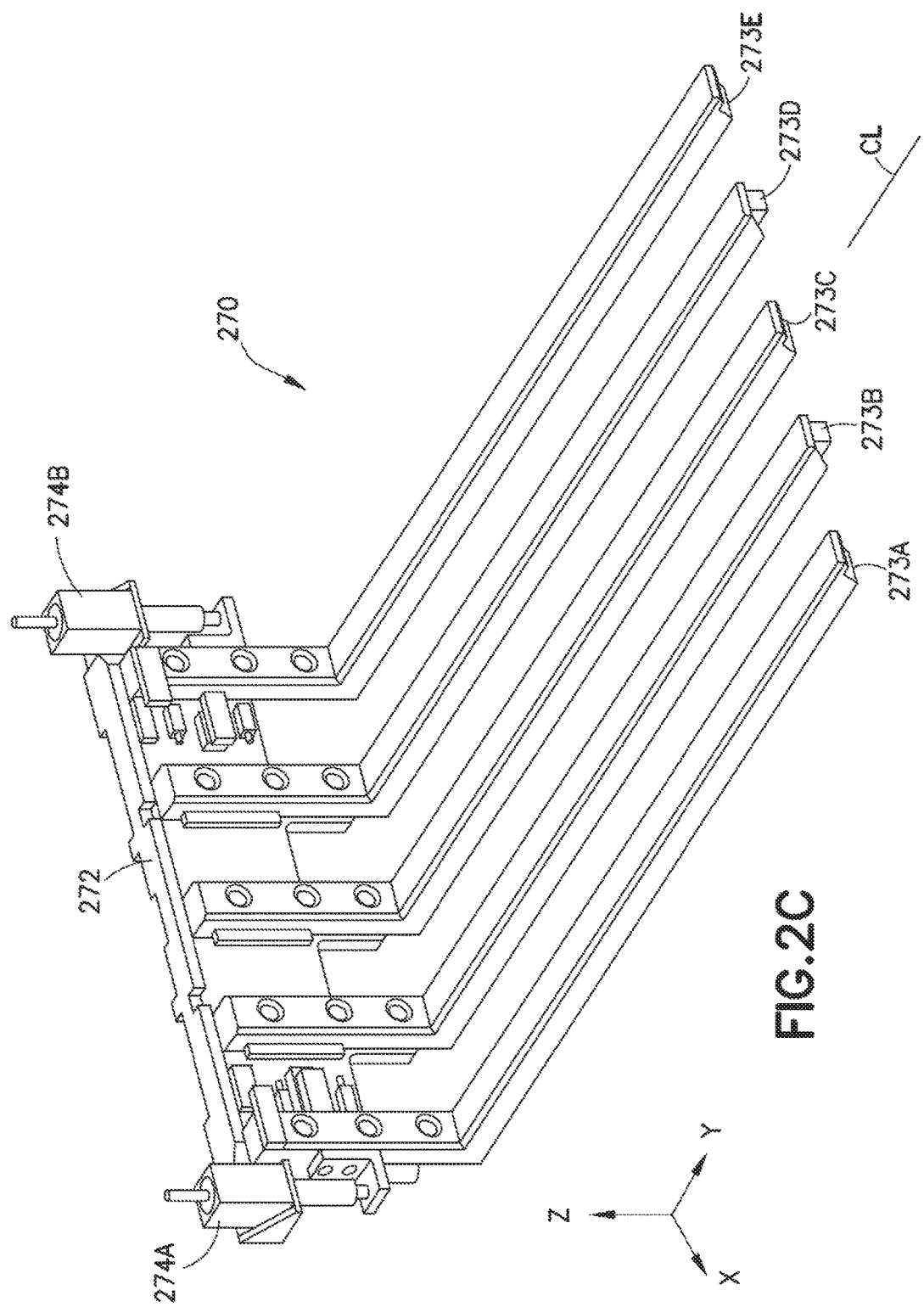
Figure 2D:
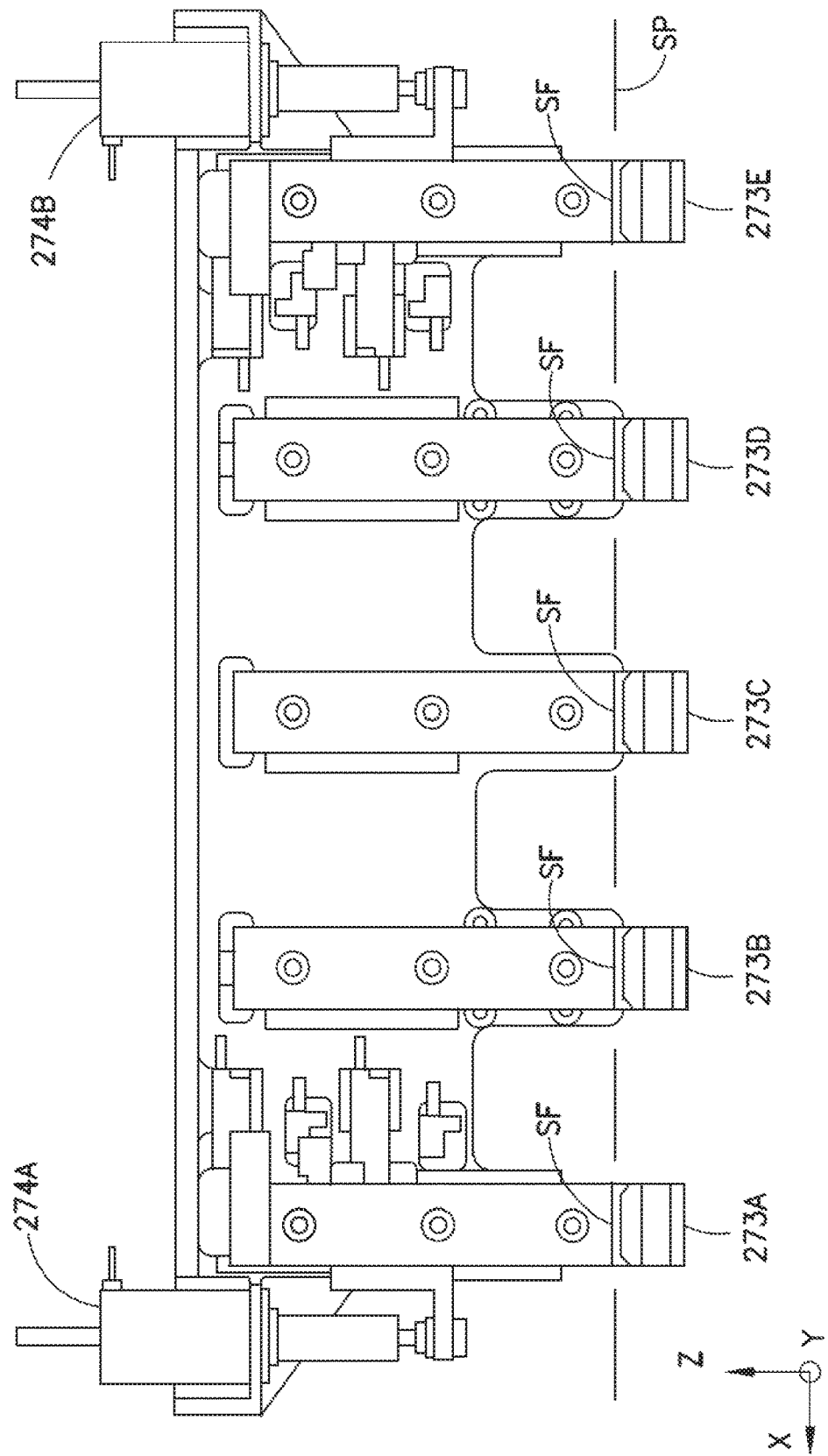

The immovable tines 373B-373D are used when transferring all sizes of case units (and/or pickfaces) while the movable tines 373A, 373E are selectively raised and lowered (e.g. in the Z direction) relative to the immovable tines 373B-373D to transfer larger case units (and/or pickfaces). Referring to FIGS. 2C and 2D an example is shown where all of the tines 273A-273E are positioned so that a case unit support surface SF of each tine 273A-273E is coincident with a picking plane SP of the pick head 270. FIGS. 2E and 2F illustrate an example were the two end tines 273A, 273E are positioned lower (e.g. in the Z direction) relative to the other tines 273B-273D so that the case unit support surface SF of tines 273A, 273E is offset from (e.g. below) the picking plane SP so that the tines 273A, 273E do not contact the one or more case units carried by the pick head 270 and do not interfere with any unpicked case units positioned in storage spaces 130S on the storage shelves or any other suitable case unit holding location.

The movement of the tines 273A-273E in the Z direction is effected by the one or more actuators 274A, 274B mounted at any suitable location of the transfer arm 110PA. In one aspect, the one or more actuators 274A, 274B are mounted to the base member 272 of the pick head 270. The one or more actuators are any suitable actuators, such as linear actuators, capable of moving one or more tines 273A-273E in the Z direction. In the aspect illustrated in, for example, FIGS. 2B-2F there is one actuator 274A, 274B for each of the movable tines 273A, 273E so that each moveable tine is independently movable in the Z direction. In other aspects one actuator may be coupled to more than one movable tine so that the more than one movable tines move as a unit in the Z direction.

As may be realized, movably mounting one or more tines 273A-273E on the base member 272 of the pick head 270 provides for full support of large case units and/or pickfaces on the pick head 270 while also providing the ability to pick and place small case units without interfering with other case units positioned on, for example, the storage shelves. The ability to pick and place variably sized case units without interfering with other case units on the storage shelves reduces a size of a gap GP (see FIG. 1A) between case units on the storage shelves. In this aspect, having three fixed, e.g. relative to the base member 272, tines 273B-273D and two movable, e.g. relative to the base member 272, tines 273A, 273E provides for fewer moving tines which means fewer drive motors, fewer guides, fewer sensors, less complexity, less bot manufacturing costs and less weight disposed on the mast 200M (which assists in sizing the lift motor 301, 301A an other structural components of the mast 200M). In addition, as may be realized, because the tines 273B-273D are fixed to the base member 272 there is no duplicative motion when picking/placing case units as the lifting and lowering of case units and/or pickfaces to and from the case unit holding location is effected solely by the lift motor 301, 301A. Smaller actuators 274A, 274B may also be utilized to selectively lift and lower the tines as the actuators are lifting only the respective tines (e.g. without a case unit supported thereon) such that once the tines are aligned with the picking plane SP the tines are locked in place and do not move.

Referring again to FIGS. 2 an 3, it is again noted that the pusher bar 110PR is movable independent of the transfer arm 110PA. The pusher bar 110PR is movably mounted to the frame in any suitable manner such as by, for example, a guide rod and slide arrangement and is actuated along the Y direction (e.g. in a direction substantially parallel to the extension/retraction direction of the transfer arm 110PA). In one aspect at least one guide rod 360 is mounted within the payload section 110PL so as to extend transversely relative to the longitudinal axis LX of the frame 110F. The pusher bar 110PR may include at least one slide member 360S configured to engage and slide along a respective guide rod 360. In one aspect, at least the guide rod/slide arrangement holds the pusher bar 110PR captive within the payload section 110PL. The pusher bar 110PR is actuated by any suitable motor and transmission, such as by motor 303 and transmission 303T. In one aspect the motor 303 is a rotary motor substantially similar to motor 301, 301A, 302 and the transmission 303T is substantially similar to the belt and pulley transmissions described above. In other aspects the pusher bar 110PR may be actuated by a linear actuator having substantially no rotary components.

Figure 4:
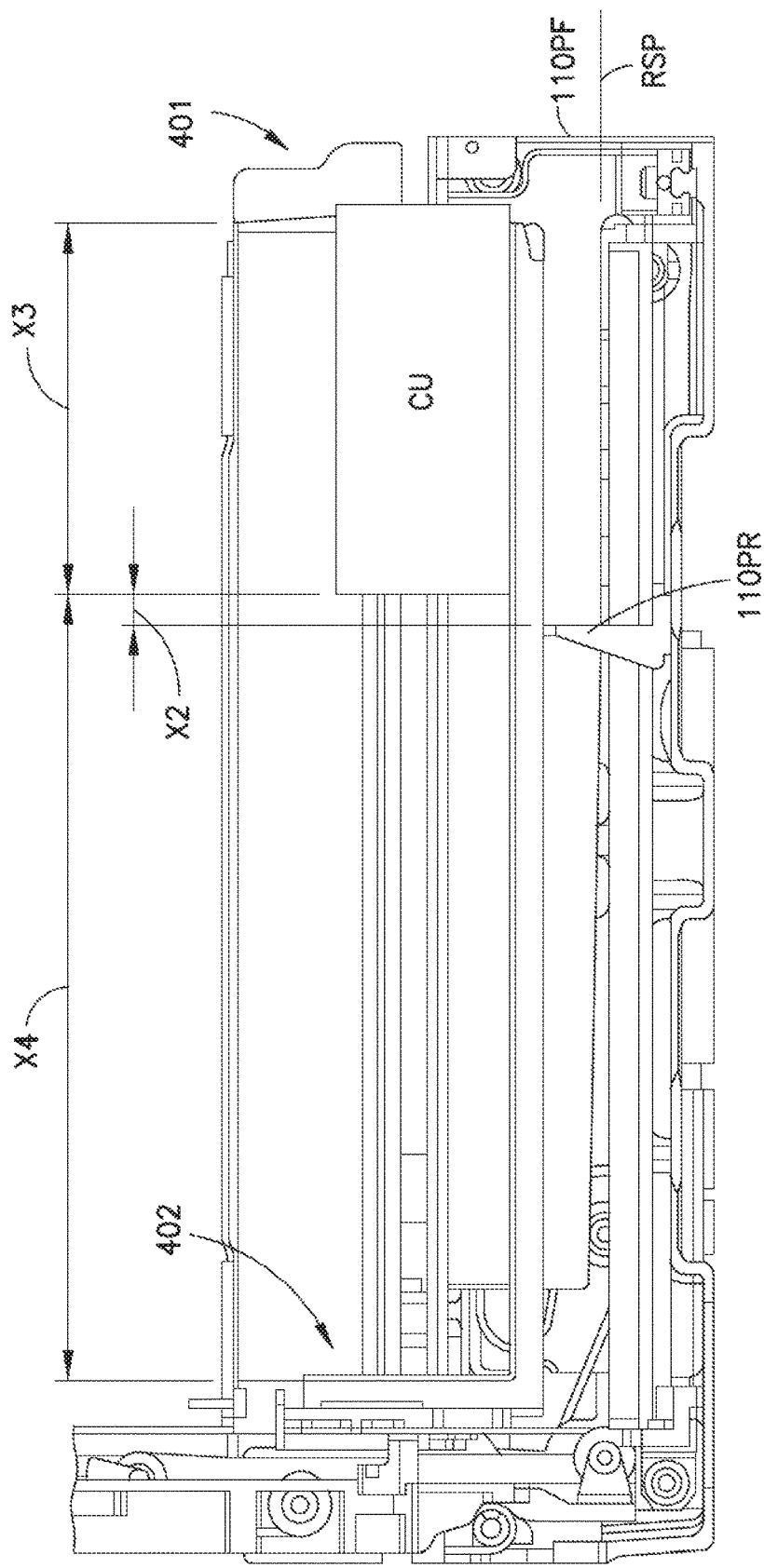
FIGS. 4-9 are schematic illustrations of exemplary payload manipulations with the transport vehicle of FIG. 2 in accordance with aspects of the disclosed embodiment.

The pusher bar 110PR is arranged within the payload section 110PL so as to be substantially perpendicular to the rollers 110RL and so that the pusher bar 110PR does not interfere with the pick head 270. As can be seen in FIG. 3, the bot 110 is in a transport configuration where at least one case unit would be supported on the rollers 110RL (e.g. the rollers collectively form the payload bed). In the transport configuration the tines 273A-273E of the pick head 270 are interdigitated with the rollers 110RL and are located below (along the Z direction) a case unit support plane RSP (see FIG. 4) of the rollers 110RL. The pusher bar 110PR is configured with slots 351 into which the tines 273A-273E pass where sufficient clearance is provided within the slots 351 to allow the tines to move below the case unit support plane RSP and to allow free movement of the pusher bar 110PR without interference from the tines 273A-273E. The pusher bar 110PR also includes one or more apertures through which the rollers 110RL pass where the apertures are sized to allow free rotation of the rollers about their respective axes. As may be realized, the independently operable pusher bar 110PR does not interfere with the rollers 110PR, extension of the transfer arm 110PA in the transverse direction (e.g. Y direction) and the lifting/lowering of the pick head 270.

Figure 5:
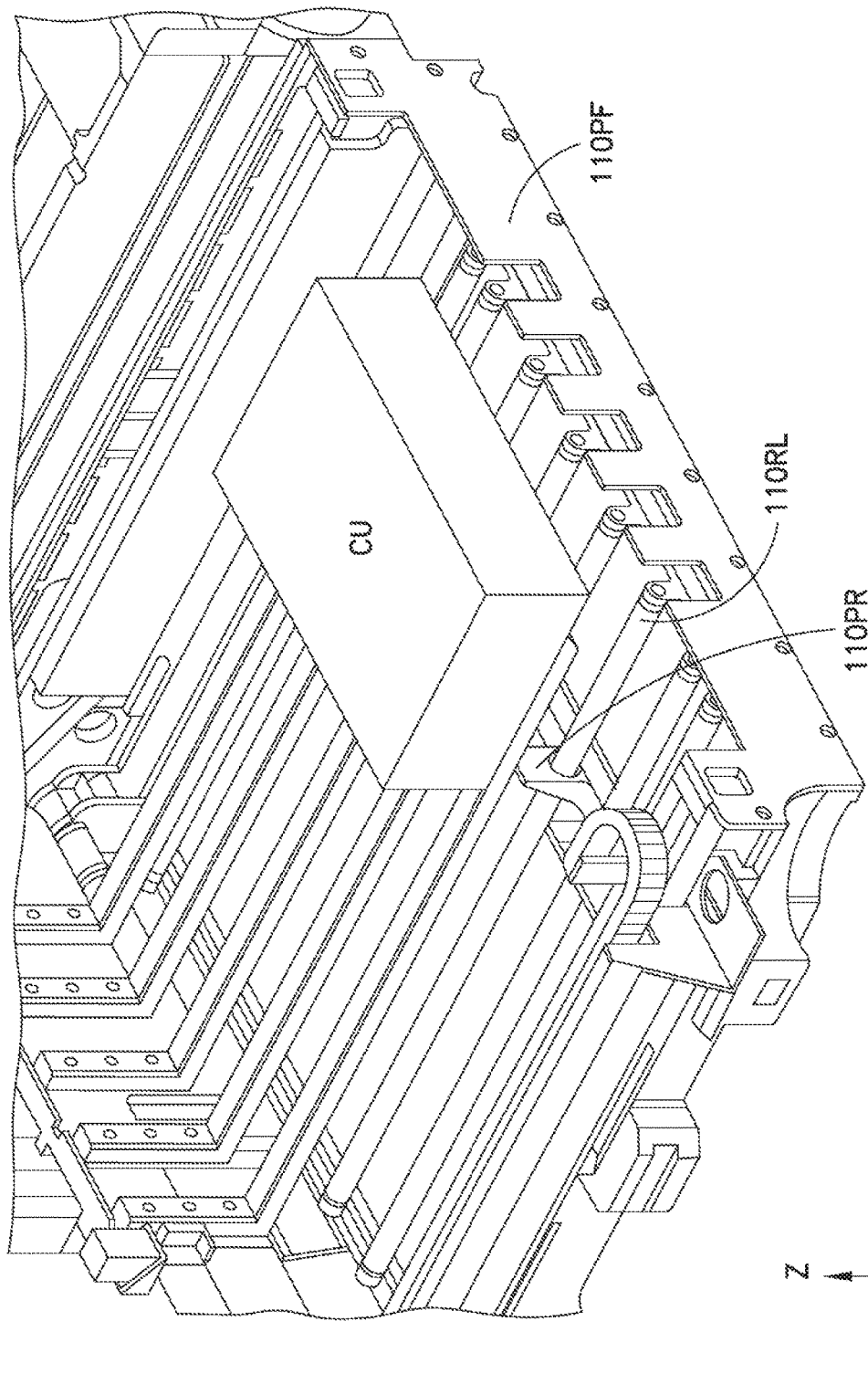
Figure 6:
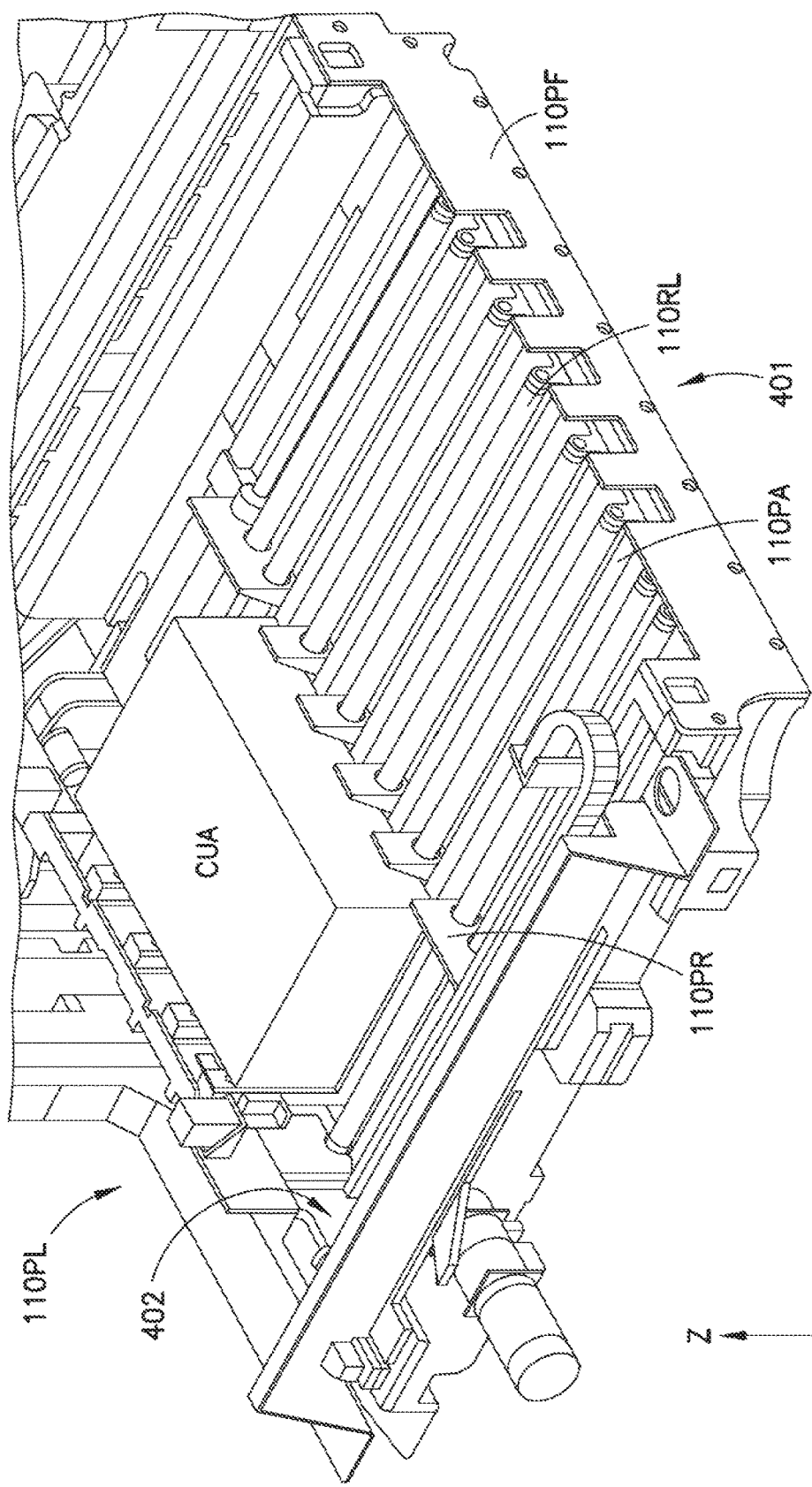
Figure 10:
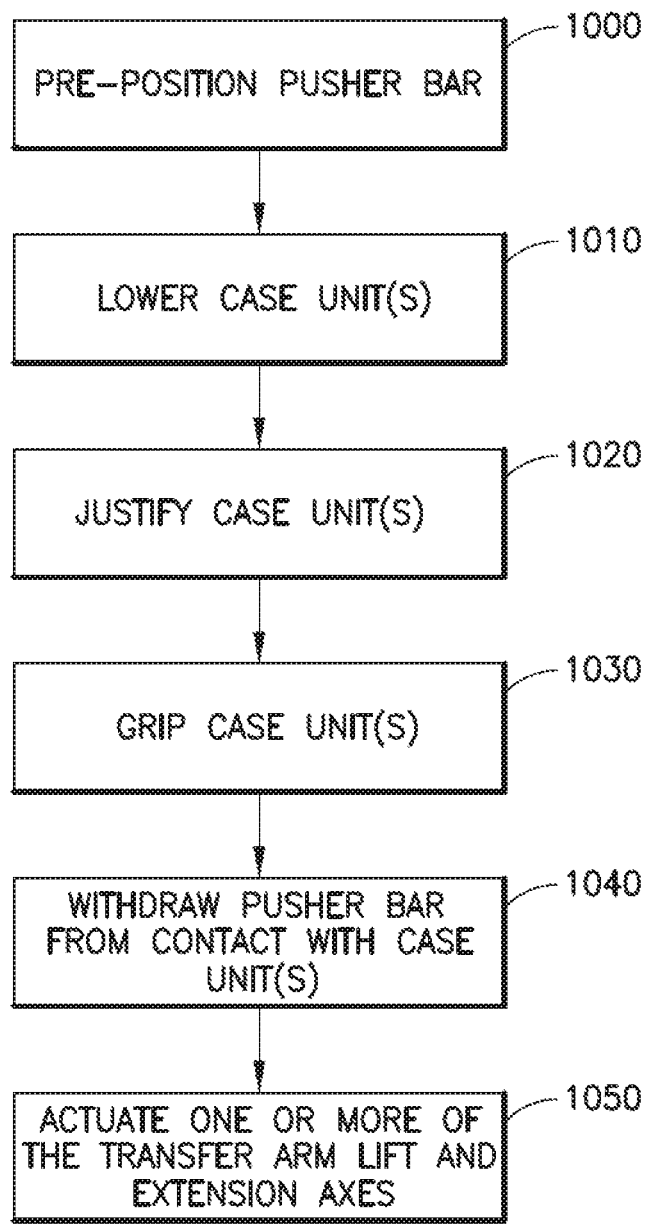
FIGS. 10, 11 and 12 are exemplary flow diagrams in accordance with aspects of the disclosed embodiment.

As noted above, because the pusher bar 110PR is a separate, standalone axis of the bot 110 that operates free of interference from the pick head 270 extension and lift axes, the pusher bar 110PR can be operated substantially simultaneously with the lifting and/or extension of the transfer arm 110PA. The combined axis moves (e.g. the simultaneous movement of the pusher bar 110PR with the transfer arm 110PA extension and/or lift axes) provides for increased payload handling throughput. For example, referring to FIGS. 4-5, during a transfer arm 110PA pick/place sequence the pusher bar 110PR is repositioned (as the case unit(s) and/or pickface are being picked and transferred into the payload section 110PL) to a location that is a predetermined distance X2 away from the contact depth X3 (e.g. the depth of the tines occupied by the case unit(s) and/or pickface CU when being picked/placed from a storage space or other case unit holding location) (FIG. 10, Block 1000). The distance X2 is a minimized distance that only allows sufficient clearance between pusher bar 110PR and the case unit(s) to allow the case unit(s) to be seated on the rollers 110RL. As the case unit(s) CU are lowered onto the rollers 110RL (FIG. 10, Block 1010) the distance travelled by the pusher bar 110PR to contact the case unit(s) CU is a shorter distance X2 when compared to moving from a back side 402 (relative to the lateral direction and an access side 401 of the payload section 110PL) of the payload section 110PL a distance X4 as with conventional transport vehicles. When the case unit(s) CU are lowered by the transfer arm 110PA and transferred to the rollers 110RL so as to be solely supported by the rollers 110RL, the pusher bar 110PR is actuated to forward (relative to the lateral direction and an access side 401 of the payload section 110PL) justify the case unit(s) CU (FIG. 10, Block 1020). For example, the pusher bar 110PB may push the case unit(s) CU laterally the Y direction so that the case unit(s) contact the fence 110PF (which is located at the access side 401 of the payload section 110PL so that a case unit reference datum may be formed through contact between the case unit(s) CU and the fence 110PF. In one aspect the pusher bar 110PR may engage or otherwise grip the case unit(s) CU during transport of the case units (e.g. so as to hold the case unit(s) against the fence 110PF) for maintaining the case unit(s) CU in a predetermined spatial relationship with each other and a reference frame REF (FIG. 2) of the bot 110 (FIG. 10, Block 1030). When placing the case unit(s) the pusher bar 110PR, after justifying the case unit(s) CU against the fence 110PF, is withdrawn (e.g. in the Y direction) from contact with the case unit(s) CU (FIG. 10, Block 1040). Substantially immediately after the pusher bar 110PR disengages the case unit(s) CU one or more of the lift axis (e.g. in the Z direction) and extension axis (e.g. in the Y direction) of the transfer arm 110PA are actuated substantially simultaneously with the withdrawing movement of the pusher bar 110PR (FIG. 10, Block 1050). In one aspect both the lift and extension axes are actuated when the pusher bar is withdrawn from contact with the case unit(s) CU while in other aspect one of the lift and extension axes is actuated. As may realized, the simultaneous movement of the transfer arm 110PA lift axis and/or extension axis with the withdrawal of the pusher bar 110PR as well as the decreased distance the pusher moves to justify the case unit(s) CU decreases the time needed to transfer case unit(s) CU to and from the bot 110 and increases throughput of the storage and retrieval system 100.

Figure 11:
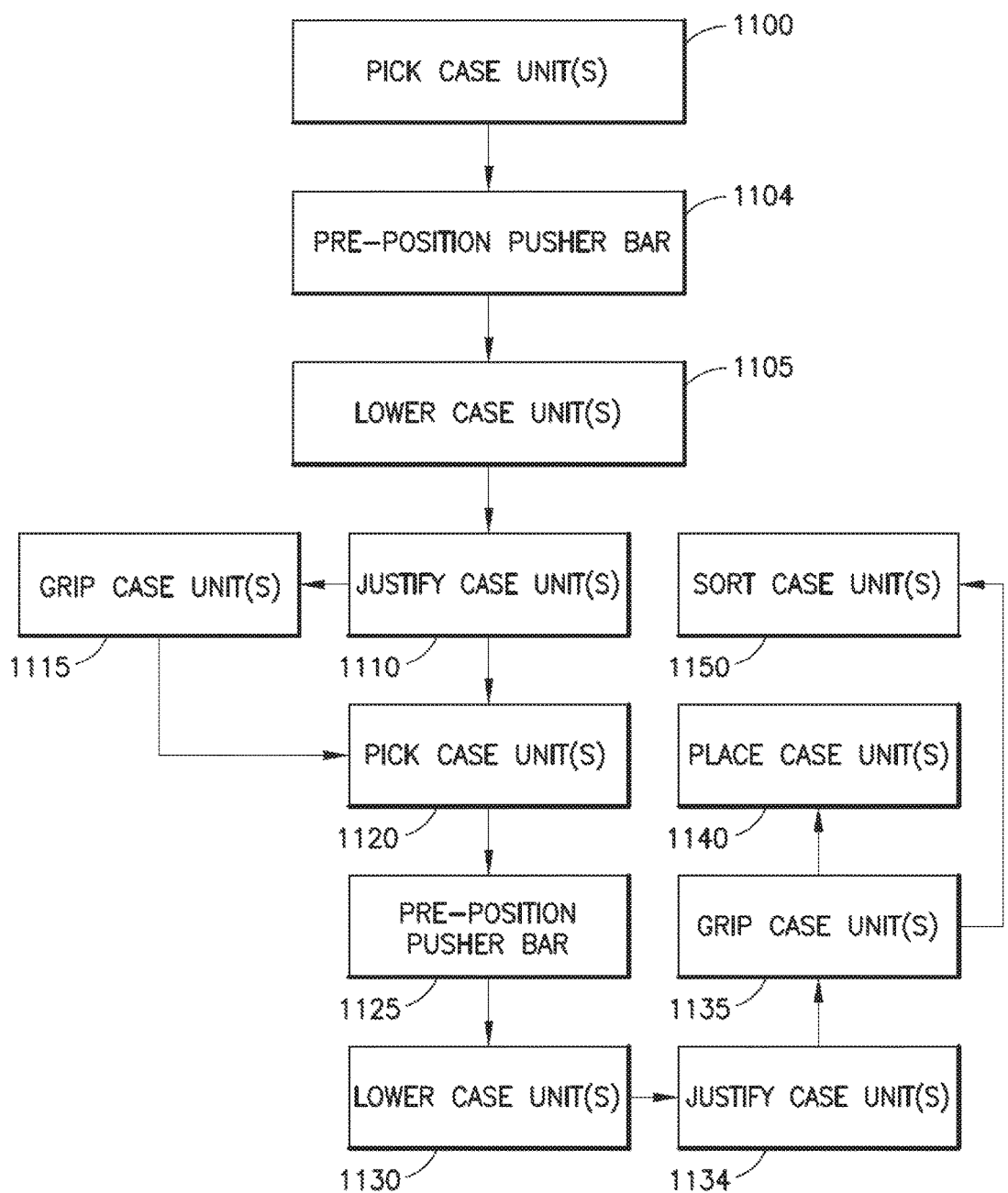

In another aspect of the disclosed embodiment, multiple case units can be substantially simultaneously carried and manipulated within the payload section 110PL to further increase throughput of the storage and retrieval system 100. In one aspect the manipulation of the case units CU is a sorting of the case units where the cases are positioned on the transfer arm 110PA for picking/placement of the case units and/or positioned so that the case units are not transferred and remain on the transfer arm 110PA while other case units are transferred to and from the transfer arm 110PA. Here, the bot 110 picks one or more case units from storage with a common transfer arm where placement of the case units on the common transfer arm corresponds to a predetermined order out sequence as will be described in greater detail below (e.g. the case units are sorted on-the-fly (e.g. during transport with the bot 110 or otherwise while being held in a payload section of or by the bot 110 while the bot is travelling along a surface or is stationary)). As an example of case manipulation on the bot 110, referring to FIGS. 6-9, case unit(s) CUA may be picked from a case unit holding location (e.g. such as storage spaces 130S, a lift transfer station and/or a buffer station) and transferred into the payload section 110PL (FIG. 11, Block 1100). As the case unit(s) CUA is being transferred into the payload section 110PL the pusher bar 110PR may be pre-positioned (FIG. 11, Block 1104) adjacent the fence 110PF so that the pusher bar 110PR is positioned between the case unit(s) CUA and the fence 110PF when the case unit(s) CUA is lowered for transfer to the rollers 110RL (FIG. 11, Block 1105). The pusher bar 110PR is actuated to push the case unit(s) CUA (resting on the rollers 110RL) in the Y direction towards the back (e.g. rear) 402 of the payload section 110PL so that the case unit(s) CUA contacts a justification surface 273JS (FIG. 2E) of the tines 273A-273E and is justified to the back 402 of the payload section 110PL (FIG. 11, Block 1110).

Figure 7:
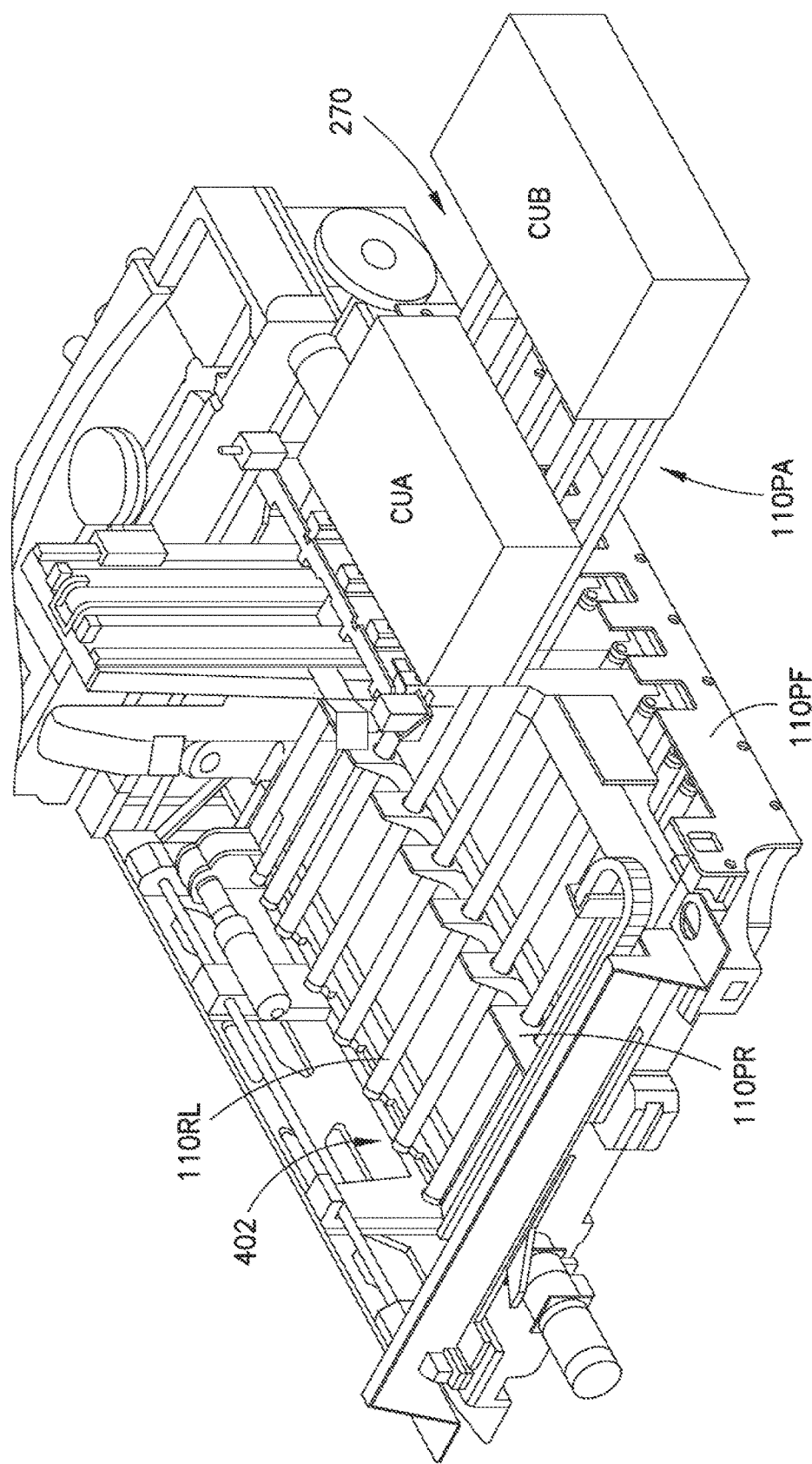
Figure 8:
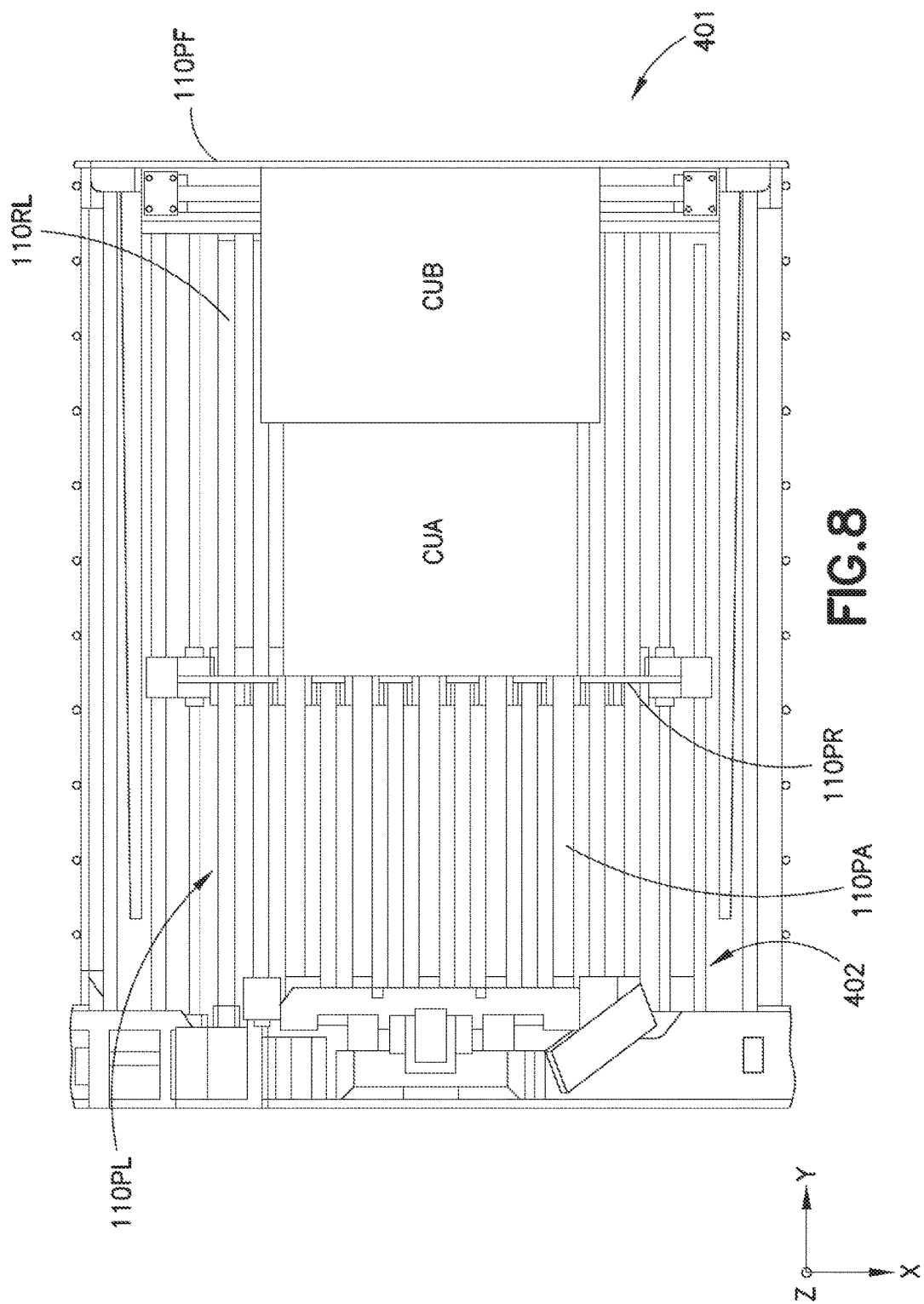
Figure 9:
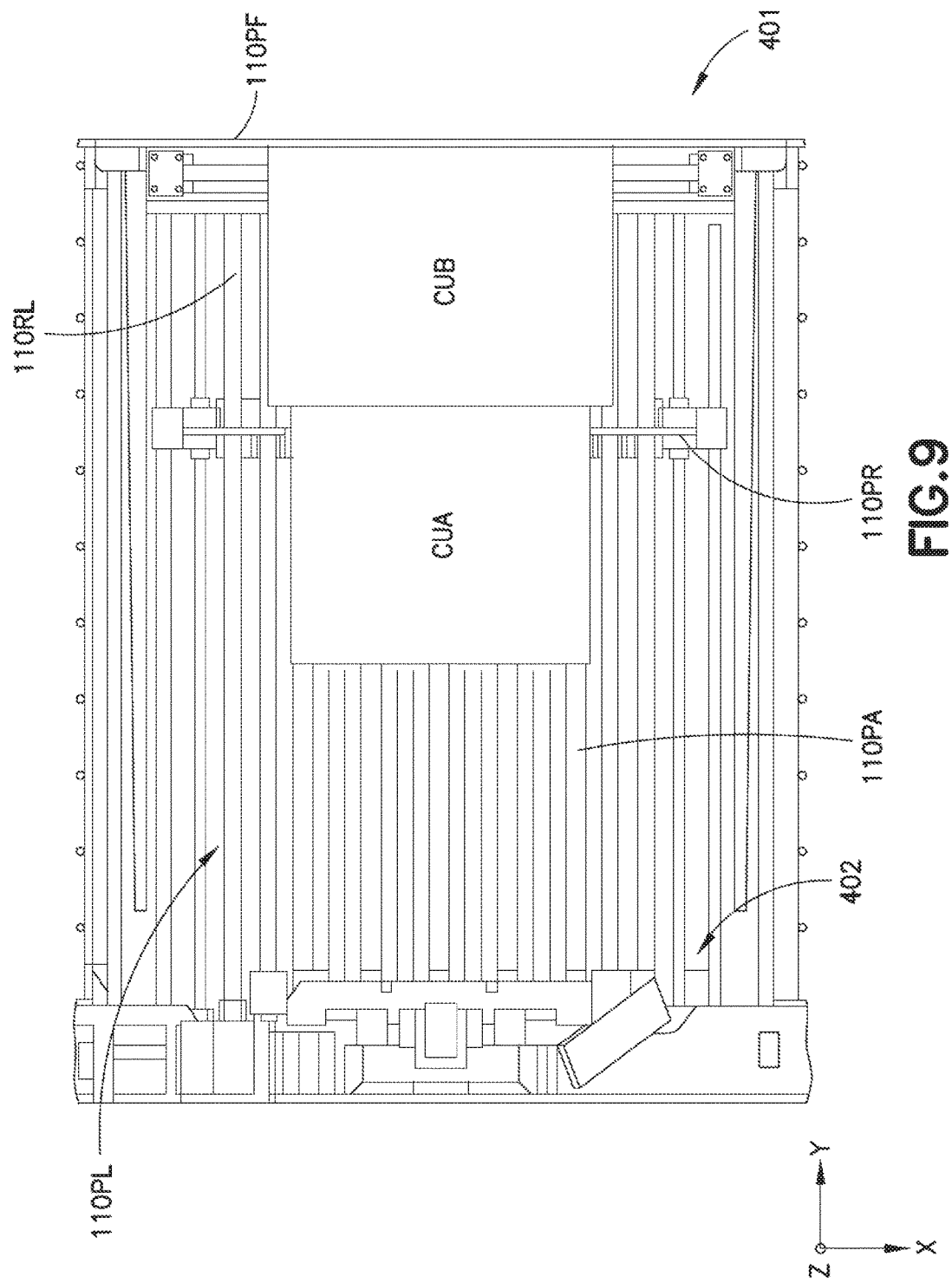
Figure 12:
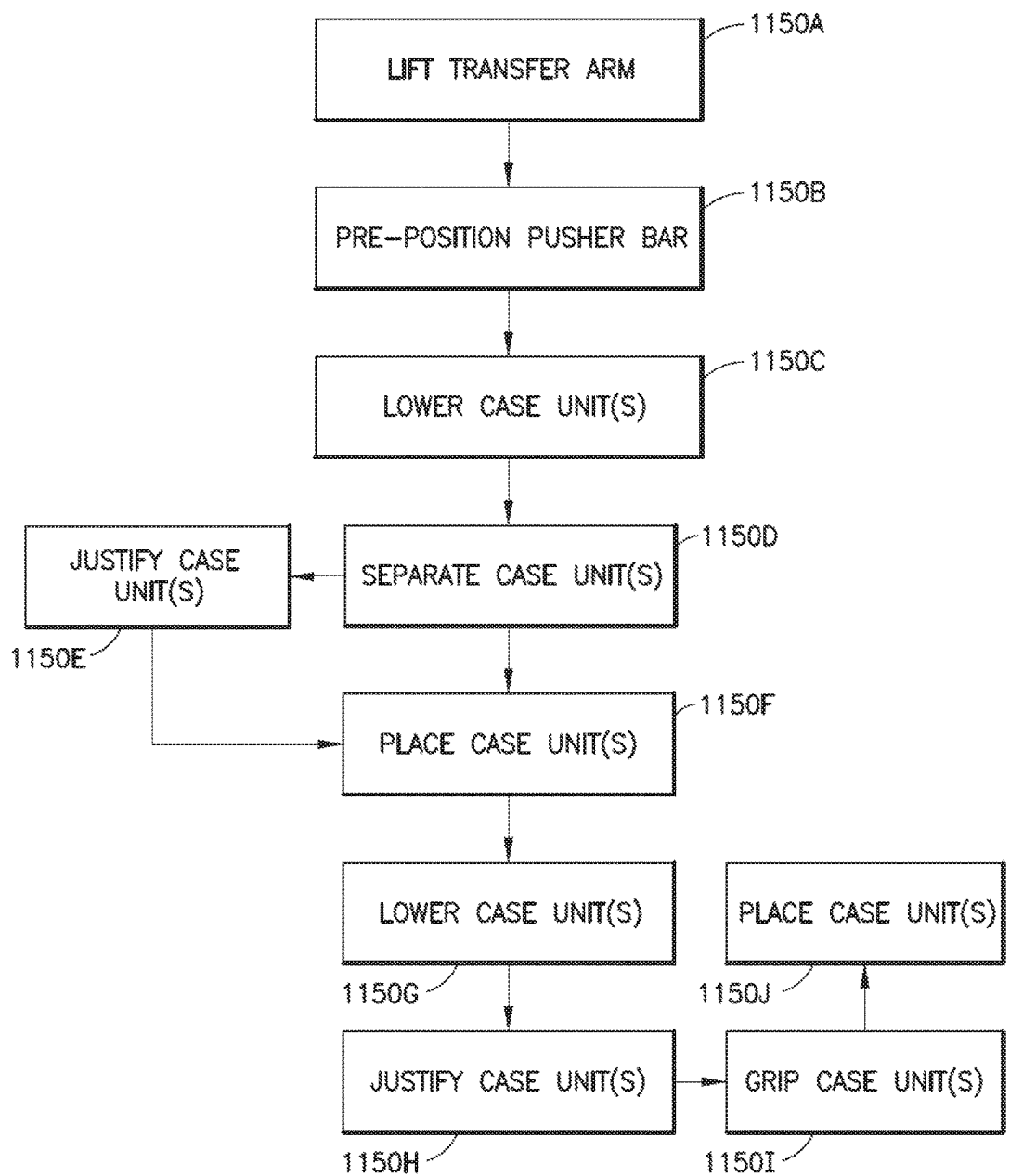

In one aspect, where the bot 110 traverses the picking aisle 130A and/or transfer deck 130B prior to picking subsequent case units, the pusher bar 110PR remains in contact with (e.g. grips) the case unit(s) CUA during transport of the case unit(s) between case unit holding locations so that the case unit(s) CUA remain in a predetermined location at the back 402 of the payload section 110PL (and/or at a predetermined location longitudinally) relative to the reference frame REF of the bot 110 (FIG. 11, Block 1115). To pick subsequent case units the pusher bar 110PR is moved in the Y direction to disengage the case unit(s) CUA and the lift and extension axes of the transfer arm 110PA are actuated to retrieve another case unit(s) CUB from a case unit holding location (e.g. such as storage spaces 130S, a lift transfer station and/or a buffer station) (FIG. 11, Block 1120). While the case unit(s) CUB are being picked the pusher bar 110PR is positioned in the Y direction adjacent the back 402 of the payload section 110PL so as to be located between the case units CUA and the justification surface 273JS of the tines 273A-273E (FIG. 11, Block 1125). The case unit(s) CUB are transferred into the payload section and lowered/placed on the rollers 110RL (FIG. 11, Block 1130) so that the case units CUA, CUB are arranged relative to each other along the Y axis. The pusher bar 110PR is actuated in the Y direction to push the case units CUA, CUB towards the fence 110PF to forward justify the case units CUA, CUB (FIG. 11, Block 1134) and grip/hold the case units CUA, CUB for transport (FIG. 11, Block 1135). As may be realized, in one aspect the case units CUA, CUB may be placed at a case unit holding location together (FIG. 11, Block 1140) while in other aspects the case units CUA, CUB may be transported to and placed at separate case unit holding locations.

Where the case units CUA, CUB are sorted (FIG. 11, Block 1150) for placement at separate locations, the case units CUA, CUB are separated from each other in the payload section 110PL. For example, the pick head 270 of the transfer arm 110PA may be moved in the Z direction to lift the case units CUA, CUB from the rollers 110RL by an amount sufficient to allow the pusher bar 110PR to pass beneath the case unit(s) (FIG. 12, Block 1150A). As the case units CUA, CUB are lifted the pusher bar 110PR is positioned along the Y direction so as to be located between the case units CUA, CUB (see FIG. 9) (FIG. 12, Block 1150B). The pick head 270 is lowered so that the case units CUA, CUB are transferred to the rollers 110RL and so that the pusher bar is inserted between the case units CUA, CUB (FIG. 12, Block 1150C). The pusher bar 110PR is moved in the Y direction (e.g. to separate the case unit(s)) to move case unit(s) CUA towards the back 402 of the payload section 110PL (e.g. against the justification surface 273JS of the tines 273A-273E or any other suitable position) while the case unit(s) CUB remain at the front of the payload section 110PL adjacent the fence 110PF (e.g. as shown in FIG. 7) (FIG. 12, Block 1150D). As may be realized, where the case units are held against the justification surface 273JS of the tines during transport, the pusher bar is moved in the Y direction (e.g. to separate the case unit(s)) to move case unit(s) CUB towards the front 401 of the payload section 110PL (e.g. against the fence 110PF or any other suitable position) while the case unit(s) CUA remain at the back of the pay section 110PL adjacent the justification surface 273JS. The pusher bar 110PR may also be moved in the Y direction to re-justify the case unit(s) CUB against the fence 110PF to position the case unit(s) on the tines 273A-273E for placement at a case unit holding location (FIG. 12, Block 1150E). As may be realized, with the case unit(s) CUA being positioned substantially against the justification surface 273JS of the tines 273A-273E (e.g. of the pick head 270) the case unit(s) CUB can be placed at a case unit holding location substantially without interference from the case unit(s) CUA (FIG. 12, Block 1150F), e.g. the case unit CUA is free from contacting case units disposed at the case unit holding location. The case unit(s) CUA is lowered/transferred back into the payload section 110PL (e.g. by retracting and lowering the transfer arm 110PA) (FIG. 12, Block 1150G). The pusher bar 110PR, which is pre-positioned between the justification surface 273JS and the case unit(s) CUA, pushes the case unit(s) CUA, which is disposed on the rollers 110RL, against the fence 110PF to forward justify the case unit(s) CUA for placement at another case unit holding location (e.g. different than the holding location that case unit(s) CUB were placed) (FIG. 12, Block 1150H). The pusher bar 110PR remains against the case unit(s) CUA for gripping (e.g. with the fence) the case unit(s) during transport to the other case unit holding location (FIG. 12, Block 1150I). The pusher bar 110PR moves away from the case unit(s) CUA and the transfer arm is actuated to lift and extend the pick head 270 for placing the case unit(s) CUA at the other case unit holding location (FIG. 12, Block 1150J).

Figure 13:
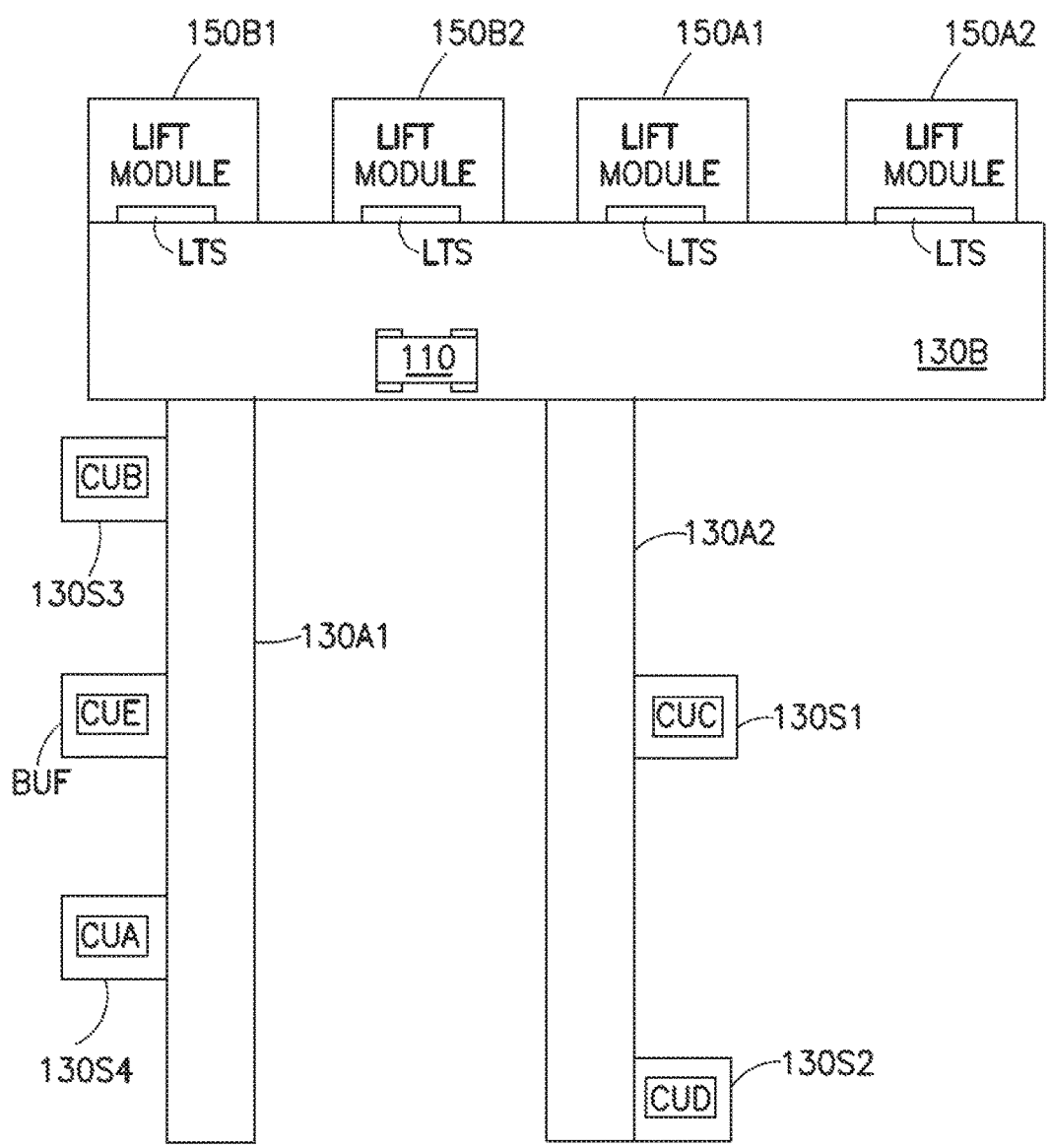
FIG. 13 is a schematic illustration of a portion of the storage and retrieval system of FIG. 1.

An example of a case unit(s) pick and place operation with on-the-fly sortation of the case units will be described with respect to FIG. 13 for creating a mix pallet load according to a predetermined order out sequence in and/or in the predetermined order sequence (e.g. an order out sequence) of picked items according to, for example, an order, fulfilling one or more customer orders, in which case units CU are sequenced for placement in one or more bag(s), tote(s) or other container(s) TOT at an operator station 160EP (as shown in FIG. 15). The bot 110 picks one or more case unit(s), CUA, CUB (see FIG. 7) from one or more case unit holding location(s). As noted above, the case unit holding location(s) include input lift modules 150A1, 150A2, outbound lift modules 150B1, 150B2, transfer or buffer stations LTS for interfacing with the lift modules 150A1, 150A2, 150B1, 150B2 and storage spaces 130S1-130S4. In one aspect, the case units CUA, CUB are picked from the same location (e.g. such as lift module 150A1 or 150A2). In another aspect the case units CUA, CUB are picked from two different (e.g. a first and a second) locations (e.g. such as lift modules 150A1 and 150A2) where the pusher member 110PR justifies one or more of the case units CUA, CUB picked from the first location so that the other one(s) of the case units CUA, CUB can be picked from the second location in a manner substantially similar to that described above.

In one aspect input lift modules 150A1, 150A1 may receive dissimilar types (or in other aspects the same type) of case units from their respective pallets where the case units are to be stored in the same (or different) picking aisles. Rather than have two separate bots 110 pick the case units from each of input lift modules 150A1, 105A2 a single bot 110 picks up both case units CUA, CUB from the input lift modules 150A1, 150A2 with a common transfer arm 110PA and transfers the case units CUA, CUB to their respective predetermined storage spaces 130S1-130S4. The bot 110 traverses the transfer deck 130B and enters a predetermined picking aisle 130A1, 103A2 to which the one or more of the case units is to be placed. As an example, the bot 110 enters picking aisle 130A1 and places case unit(s) CUB at storage space 130S3 in a manner substantially similar to that described above where the case units CUA, CUB are separated from one another on the pick head 270 by pusher bar 110PR so that case unit(s) CUB is transferred to storage space 130S3 free from interference from case unit(s) CUA. In one aspect the bot 110 continues to traverse picking aisle 130A1 to storage spaces 130S4 where case unit(s) CUA are placed by the bot 110. In other aspects the case unit(s) CUA, CUB are placed in any suitable picking aisle and case unit holding location, such as in different picking aisles, in different storage spaces, in the same picking aisle and/or in the same storage space.

Figure 14:
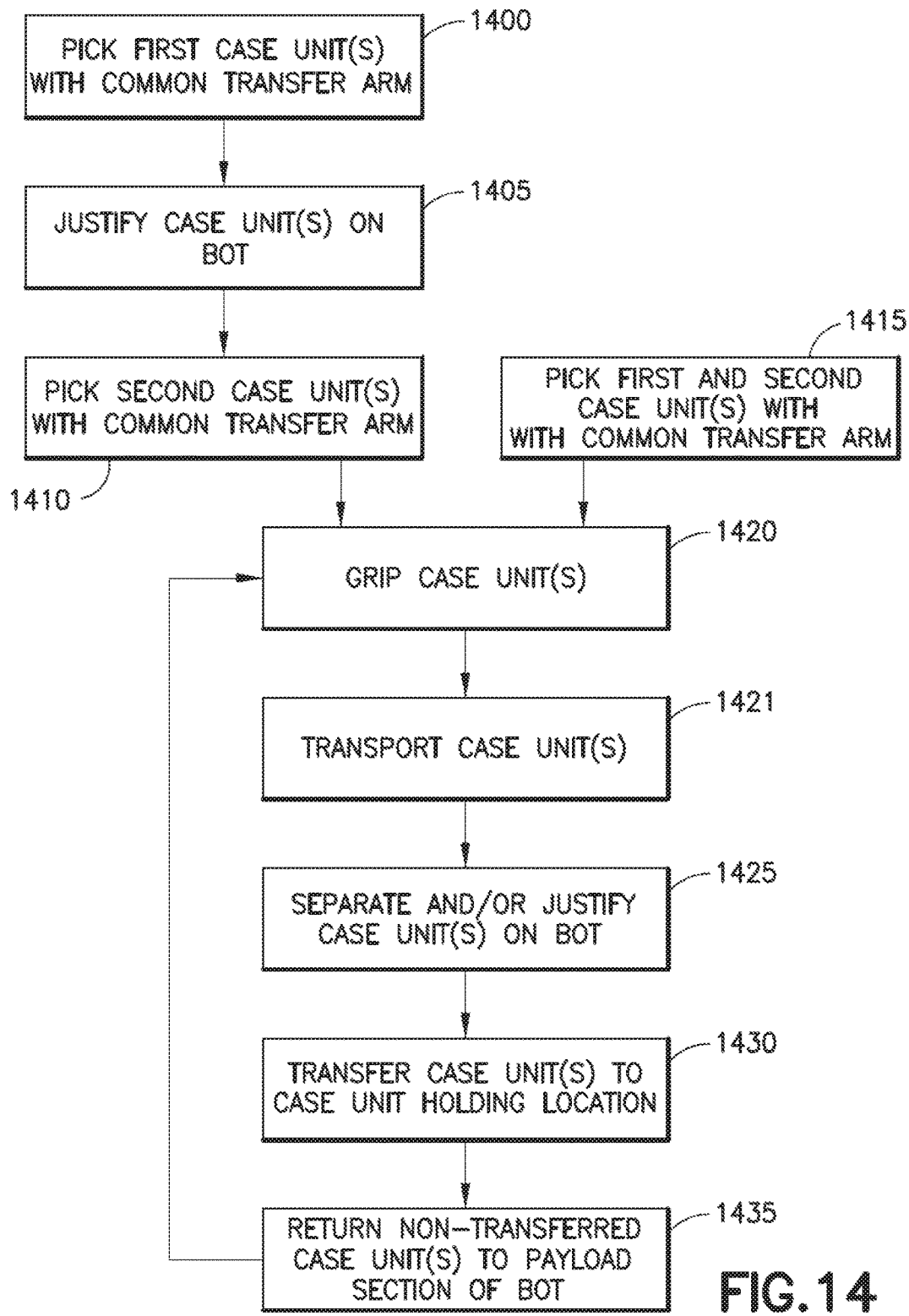
FIG. 14 is an exemplary flow diagram in accordance with aspect of the disclosed embodiment.

As may be realized, and as noted above, case units are output from the storage and retrieval system in a predetermined sequence to fulfill customer orders and build mixed shipping pallets. Here, the case units CUA, CUB are sorted by the bot into one or more predetermined case unit holding locations according to the predetermined case unit output sequence as the case units are output from the storage and retrieval system. For example, assuming customer orders require case unit(s) CUC to be delivered to output lift 150B1 and case unit(s) CUD to be delivered to output lift 150B2, the bot 110 enters picking aisle 130A1 and picks case unit CUC from storage space 130S1 (FIG. 14, Block 1400). The case unit(s) CUC may be justified on the bot 110 towards the rear of the payload section 110PL as described above (FIG. 14, Block 1405). The bot travels through the picking aisle 130A2 and picks case unit(s) CUD from a different storage space 130S2 with the common transfer arm 110PA so that both case unit(s) CUC, CUD are located adjacent one another on the common transfer arm 110PA (FIG. 14, Block 1410). In other aspects both case units CUC, CUD are picked by the common transfer arm 110PA from a common storage space 130S (FIG. 14, Block 1415). As may be realized, in one aspect, the controller 110C is configured to effect picking of the case unit(s) in an order that is opposite an order in which the case unit(s) are placed. The bot 110 grips both case units CUC, CUD within the payload section 110PL and exits the picking aisle 130A2 (FIG. 14, Block 1420). The bot travels along the transfer deck and interfaces with output lift 150B2 (FIG. 14, Block 1421). The bot separates the case units CUC, CUD within the payload section 110PL, as described above, so that case unit(s) CUD is justified towards the front of the payload section 110PL and case unit(s) CUC is justified towards the back of the payload section 110PL (FIG. 14, Block 1425). The case unit CUD is transferred to the output lift 150B2 directly by the bot 110 (e.g. the pick head 270 of the bot interfaces directly with a shelf of the lift) or indirectly such as through the transfer/buffer station LTS (the case unit is transferred to the station LTS and the station interfaces with the shelf of the lift) (FIG. 14, Block 1430). The bot retracts the transfer arm 110PA to return the case unit(s) CUC to the payload section 110PL (FIG. 14, Block 1435) and grips the case unit CUC (FIG. 14, Block 1420). The case unit(s) CUC is transported to output lift 150B1 (FIG. 14, Block 1421), justified toward the front of the payload section 110PL (FIG. 14, Block 1425), as described above, and transferred to output lift 150B1 either directly or indirectly, as described above (FIG. 14, Block 1430). In other aspects, depending on the predetermined case unit output sequence, the bot 110 places both case unit(s) CUC, CUD at a common location, such as at one of output lifts 150B1, 150B2.

Figure 16:
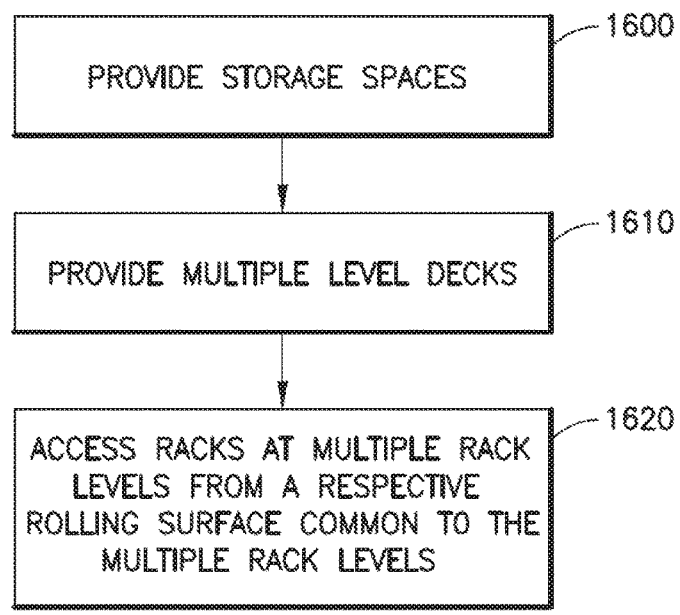
FIG. 16 is an exemplary flow diagram in accordance with aspects of the disclosed embodiment.

Referring to FIG. 16, in accordance with aspects of the disclosed embodiment, storage spaces arrayed on racks along picking aisles are provided (FIG. 16, Block 1600). Multiple level decks are also provided (FIG. 16, Block 1610), where at least one deck level of the multiple level decks communicates with each aisle, where the multiple level decks and aisles define a rolling surface for an autonomous transport vehicle at each level of the multiple level decks. Racks at multiple rack levels are accessed from a respective rolling surface that is common to the multiple rack levels (FIG. 16, Block 1620), where the racks are disposed along at least one aisle at each level of the multiple lever decks. In one aspect, a vertical pitch between rack levels varies for a portion of a respective aisle. In one aspect, the vertical pitch between at least two rack levels of the portion of the respective aisle is related to another vertical pitch between at least two other rack levels of another aisle portion of the respective aisle so that the autonomous transport vehicle effects multiple picks in an ordered sequence in a common aisle pass. In one aspect, the vertical pitch between at least two rack levels of the portion of the respective aisle is related to another vertical pitch between at least two other rack levels of another aisle portion of the respective aisle so that the vertical pitch and the other vertical pitch effects substantially filling a vertical space between the multiple deck levels with stored items.

In accordance with one or more aspects of the disclosed embodiment, an autonomous transport vehicle includes a frame forming a payload section configured to hold one or more pickfaces; a transfer arm movably mounted to the frame; a drive section connected to the frame; and a controller connected to the drive section, the controller being configured to effect an on-the-fly sortation of pickfaces carried by the autonomous transport vehicle according to a predetermined case out order sequence where the controller commands the drive section so that two or more pickfaces are picked from one or more first case unit holding locations and placed at one or more different second case unit holding locations according to the predetermined case out order sequence.

In accordance with one or more aspects of the disclosed embodiment, the controller is configured to effect picking of the two or more pickfaces in an order that is opposite an order in which the two or more pickfaces are placed.

In accordance with one or more aspects of the disclosed embodiment, the transfer arm is common to the two or more pickfaces such that the transfer arm is configured to hold the two are more pickfaces adjacent one another.

In accordance with one or more aspects of the disclosed embodiment, the autonomous transport vehicle further includes a justification member disposed within the payload section so as to move transverse to a longitudinal axis of the frame wherein the controller is configured to control a combined movement of the justification member and the transfer arm to effect the sorting of the two or more pickfaces carried in the payload section.

In accordance with one or more aspects of the disclosed embodiment, the autonomous transport vehicle further includes a justification member connected to the drive section and the controller, the justification member being movably mounted to the frame where the transfer arm and the justification member are each independently movable relative to each other.

In accordance with one or more aspects of the disclosed embodiment, the controller is configured to control the drive section and effect movement of the justification member and transfer arm so that the on-the-fly sortation is effected by retention of at least one of the two or more pickfaces within the payload section while at least another of the two or more pickfaces is transferred to or from the payload section.

In accordance with one or more aspects of the disclosed embodiment, the transfer arm includes a plurality of payload support tines and is movable between a raised and lowered position, and the justification member is configured to extend between the tines when the transfer arm is in the lowered position.

In accordance with one or more aspects of the disclosed embodiment, the autonomous transport vehicle further includes a payload bed and a justification member within the payload section, the payload bed including laterally arranged payload supports that extend through apertures in the justification member.

In accordance with one or more aspects of the disclosed embodiment, the transfer arm includes payload support tines that are spaced so as to be interdigitated with the laterally arranged payload supports such that a lowered position of the payload support tines transfers the one or more payload items to the laterally arranged payload supports.

In accordance with one or more aspects of the disclosed embodiment, an automated storage and retrieval system autonomous transport vehicle includes a frame having a longitudinal axis and forming a payload section configured to hold one or more payload items; a justification member disposed within the payload section so as to move transverse to the longitudinal axis; a transfer arm disposed as least partly within the payload section; and a controller connected to the justification member and the transfer arm, the controller being configured to control a combined movement of the justification member and the transfer arm to effect an on-the-fly sorting of the one or more payload items carried in the payload section.

In accordance with one or more aspects of the disclosed embodiment, the justification member and the transfer arm are each independently movable relative to each other.

In accordance with one or more aspects of the disclosed embodiment, the controller configured to effect movement of the justification member the transfer arm so that the justification member is inserted between two of the one or more payload items to cause a physical separation of the two of the one or more payload items.

In accordance with one or more aspects of the disclosed embodiment, the justification member is configured to bi-directionally move the one or more payload items transversely within the payload section.

In accordance with one or more aspects of the disclosed embodiment, the controller is configured to control movement of the justification member and transfer arm so that sorting is effected by retention of at least one of the one or more payload items within the payload section while at least another of the one or more payload items is transferred to or from the payload section.

In accordance with one or more aspects of the disclosed embodiment, the transfer arm includes a plurality of payload support tines and is movable between a raised and lowered position, and the justification member is configured to extend between the tines when the transfer arm is the lowered position.

In accordance with one or more aspects of the disclosed embodiment, the autonomous transport vehicle further includes a payload bed within the payload section, the payload bed including laterally arranged payload supports that extend through apertures in the justification member.

In accordance with one or more aspects of the disclosed embodiment, the transfer arm includes payload support tines that are spaced so as to be interdigitated with the laterally arranged payload supports such that a lowered position of the payload support tines transfers the one or more payload items to the laterally arranged payload supports.

In accordance with one or more aspects of the disclosed embodiment, a method of transporting payload items carried in a payload section of an autonomous transport vehicle having a common transfer arm is provided. The method includes supporting the payload items within the payload section; and sorting the payload items within the a load section for ordered placement in a storage and retrieval system, wherein sorting the payload items includes spatially separating at least one of the payload items disposed on the common transfer arm from another of the payload items and the at least one of the payload items retained on the common transfer arm while the other of the payload items is transferred from the payload section with the common transfer arm.

In accordance with one or more aspects of the disclosed embodiment, sorting the payload items further includes transferring the payload items between a payload bed of the autonomous transport vehicle and the common transfer arm to effect repositioning of the at least one of the payload items.

In accordance with one or more aspects of the disclosed embodiment, sorting the payload items further includes inserting a justification member between the payload items to effect repositioning of the at least one of the payload items.

In accordance with one or more aspects of the disclosed embodiment, the method further includes repositioning at least one of the payload items disposed on the common transfer arm.

In accordance with one or more aspects of the disclosed embodiment, an automated storage and retrieval system autonomous transport vehicle comprises: a frame having a longitudinal axis and forming a payload section configured to hold one or more payload items; a transfer arm that is common to the one or more payload items, the transfer arm being disposed as least partly within the payload section and being configured to hold the one or more payload items; and a payload item justification member disposed within the payload section independent of the transfer arm and configured so as to engage at least one of the one or more payload items and move transverse to the longitudinal axis, where movement of the payload item justification member is independent of movement of the transfer arm.

In accordance with one or more aspects of the disclosed embodiment, the independent movement of the justification member effects separation of at least one of the one or more payload items from another of the at least one payload items carried in the payload section.

In accordance with one or more aspects of the disclosed embodiment, the payload item justification member has a payload item justification member drive and the transfer arm has a transfer arm drive that is different than the payload item justification member drive, where each of the payload item justification member drive and the transfer arm drive has an dependent drive axis.

In accordance with one or more aspects of the disclosed embodiment, the autonomous transport vehicle further comprises a controller connected to the justification member and the transfer arm, the controller being configured to control a substantially simultaneous movement of the justification member and the transfer arm with different respective drives to configured a pickface including at least one of the one or more payload items.

In accordance with one or more aspects of the disclosed embodiment, the controller is configured to control the justification member and the transfer arm to effect separation of the one or more payload items carried in the payload section.

In accordance with one or more aspects of the disclosed embodiment, the controller is configured to effect movement of the justification member and the transfer arm so that the justification member is inserted between two of the one or more payload items to cause a physical separation of the two of the one or more payload items.

In accordance with one or more aspects of the disclosed embodiment, the controller is configured to control movement of the justification member and transfer arm to effect sorting of the one or more payload items by retention of at least one of the one or more payload items within the payload section while at least another of the one or more payload items is transferred to or from the payload section.

In accordance with one or more aspects of the disclosed embodiment, the justification member is configured to bi-directionally move the one or more payload items transversely within the payload section.

In accordance with one or more aspects of the disclosed embodiment, the transfer arm includes a plurality of payload support tines and is movable between a raised and lowered position, and the justification member is configured to extend between the tines when the transfer arm is in the lowered position.

In accordance with one or more aspects of the disclosed embodiment, the autonomous transport vehicle further comprises a payload bed within the payload section, the payload bed including laterally arranged payload supports that extend through apertures in the justification member.

In accordance with one or more aspects of the disclosed embodiment, the transfer arm includes payload support tines that are spaced so as to be interdigitated with the laterally arranged payload supports such that a lowered position of the payload support tines transfers the one or more payload items to the laterally arranged payload supports.

It should be understood that the foregoing description only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

What is claimed is:

1. A method for effecting on-the-fly sortation of pickfaces comprising:
   providing an autonomous transport vehicle having a payload section formed by a frame of the autonomous transport vehicle, and holding one or more pickfaces with the payload section;

providing a transfer arm movably mounted to the frame;
providing a drive section connected to the frame; and
effecting, with a controller connected to the drive section, an on-the-fly sortation of pickfaces carried by the autonomous transport vehicle so as to, on the fly, reorder the pickfaces carried by the autonomous transport vehicle with respect to each other according to a predetermined case out order sequence where the controller commands the drive section so that two or more pickfaces are picked up from one or more first case unit holding locations and placed at one or more different second case unit holding locations according to the predetermined case out order sequence.

2. The method of claim 1, further comprising effecting, with the controller, picking up the two or more pickfaces in an order that is opposite an order in which the two or more pickfaces are placed.

3. The method of claim 1, wherein the transfer arm is common to the two or more pickfaces, the method further comprising holding, with the transfer arm, the two or more pickfaces adjacent one another.

4. The method of claim 1, further comprising providing a justification member disposed within the payload section so as to move transverse to a longitudinal axis of the frame and controlling, with the controller, a combined movement of the justification member and the transfer arm to effect the sorting of the two or more pickfaces carried in the payload section.

5. The method of claim 1, further comprising providing a justification member connected to the drive section and the controller, the justification member being movably mounted to the frame where the transfer arm and the justification member are each independently movable relative to each other.

6. The method of claim 5, further comprising, with the controller, controlling the drive section and effecting movement of the justification member and the transfer arm so that the on-the-fly sortation is effected by retention of at least one of the two or more pickfaces within the payload section while at least another of the two or more pickfaces is transferred to or from the payload section.

7. The method of claim 5, further comprising:
moving the transfer arm between a raised and lowered position, where the transfer arm includes a plurality of payload support tines, wherein
the justification member extends between the payload support tines when the transfer arm is in the lowered position.

8. The method of claim 1, further comprising providing a payload bed and a justification member within the payload section, the payload bed including laterally arranged payload supports that extend through apertures in the justification member.

9. The method of claim 8, further comprising providing the transfer arm with payload support tines that are spaced so as to be interdigitated with the laterally arranged payload supports and transferring the one or more pickfaces to the laterally arranged payload supports by lowering the payload support tines to a lowered position.

10. A method for effecting on-the-fly sortation of payload items comprising:
providing an autonomous transport vehicle having a payload section formed by a frame of the autonomous transport vehicle, the frame having a longitudinal axis, and holding one or more payload items with the payload section;
providing a justification member disposed within the payload section to move transverse to the longitudinal axis;
providing a transfer arm disposed at least partly within the payload section; and
controlling, with a controller connected to the justification member and the transfer arm, a combined movement of the justification member and the transfer arm to effect an on-the-fly sorting of the one or more payload items carried in the payload section with respect to each other.

11. The method of claim 10, wherein the justification member and the transfer arm are each independently movable relative to each other.

12. The method of claim 10, further comprising effecting, with the controller, movement of the justification member and the transfer arm so that the justification member is inserted between two of the one or more payload items to cause a physical separation of the two of the one or more payload items.

13. The method of claim 10, further comprising bi-directionally moving, with the justification member, the one or more payload items transversely within the payload section.

14. The method of claim 10, further comprising controlling, with the controller, movement of the justification member and the transfer arm so that sorting is effected by retention of at least one of the one or more payload items within the payload section while at least another of the one or more payload items is transferred to or from the payload section.

15. The method of claim 10, further comprising:
moving the transfer arm between a raised and lowered position, where the transfer arm includes a plurality of payload support tines, wherein
the justification member is configured to extend between the payload support tines when the transfer arm is in the lowered position.

16. The method of claim 10, further comprising providing a payload bed within the payload section, the payload bed including laterally arranged payload supports that extend through apertures in the justification member.

17. The method of claim 16, further comprising providing the transfer arm with payload support tines that are spaced so as to be interdigitated with the laterally arranged payload supports and transferring the one or more payload items to the laterally arranged payload supports by lowering the payload support tines to a lowered position.

18. A method for effecting on-the-fly sortation of payload items comprising:
providing an autonomous transport vehicle having a payload section formed by a frame of the autonomous transport vehicle, the frame having a longitudinal axis, and holding one or more payload items with the payload section;
providing a transfer arm that is common to the one or more payload items, the transfer arm being disposed at least partly within the payload section and extending transverse to the longitudinal axis along an extension path;
holding with the transfer arm, the one or more payload items, and transferring, with the transfer arm, the one or more payload items to and from the payload section; and
engaging, with a payload item justification member, at least one of the one or more payload items, and moving the payload item justification member transverse to the longitudinal axis, where movement of the payload item justification member is independent of movement of the transfer arm and where the payload item justification member is disposed within the payload section so as to cross the extension path of the transfer arm, the payload item justification member being independent of the transfer arm.

19. The method of claim 18, further comprising effecting, with the independent movement of the payload item justification member, separation of at least one of the one or more payload items from another of the one or more payload items carried in the payload section.

20. The method of claim 18, further comprising providing the payload item justification member with a payload item justification member drive and providing the transfer arm with a transfer arm drive that is different than the payload item justification member drive, where each of the payload item justification member drive and the transfer arm drive has an independent drive axis.

21. The method of claim 18, further comprising controlling, with a controller connected to the payload item justification member and the transfer arm, a substantially simultaneous movement of the payload item justification member and the transfer arm with different respective drives to configure pickface including at least one of the one or more payload items.

22. The method claim 21, further comprising controlling, with the controller, the payload item justification member and the transfer arm to effect separation of the one or more payload items carried in the payload section.

23. The method of claim 21, further comprising effecting, with the controller, movement of the payload item justification member and the transfer arm so that the payload item justification member is inserted between two of the one or more payload items to cause a physical separation of the two of the one or more payload items.

24. The method of claim 21, further comprising controlling, with the controller, movement of the payload item justification member and transfer arm to effect sorting of the one or more payload items by retention of at least one of the one or more payload items within the payload section while at least another of the one or more payload items is transferred to or from the payload section.

25. The method of claim 18, further comprising bi-directionally moving, with the payload item justification member, the one or more payload items transversely within the payload section.

26. The method of claim 18, further comprising:
moving the transfer arm between a raised and lowered position, where the transfer arm includes a plurality of payload support tines, wherein
the payload item justification member extends between the payload support tines when the transfer arm is in the lowered position.

27. The method of claim 18, further comprising providing a payload bed within the payload section, the payload bed including laterally arranged payload supports that extend through apertures in the payload item justification member.

28. The method of claim 27, further comprising providing the transfer arm with payload support tines that are spaced so as to be interdigitated with the laterally arranged payload supports and transferring the one or more payload items to the laterally arranged payload supports by lowering the payload support tines to a lowered position.

* * * * *

UNITED STATES PATENT AND TRADEMARK OFFICE
CERTIFICATE OF CORRECTION

PATENT NO. : 10,377,585 B2
APPLICATION NO. : 15/848446
DATED : August 13, 2019
INVENTOR(S) : Cyrulik et al.

Page 1 of 1

It is certified that error appears in the above-identified patent and that said Letters Patent is hereby corrected as shown below:

In the Claims

Column 20, Claim 10, Line 2, after section insert -- so as -- to.

Signed and Sealed this
Twenty-fourth Day of December, 2019

Andrei Iancu
*Director of the United States Patent and Trademark Office*